United States Patent
Hoffert et al.

(10) Patent No.: US 9,917,869 B2
(45) Date of Patent: Mar. 13, 2018

(54) SYSTEM AND METHOD FOR IDENTIFYING A SEGMENT OF A FILE THAT INCLUDES TARGET CONTENT

(71) Applicant: Spotify AB, Stockholm (SE)

(72) Inventors: Eric Hoffert, South Orange, NJ (US); Ludvig Strigeus, Gothenburg (SE); Andreas Oman, Stockholm (SE)

(73) Assignee: SPOTIFY AB, Stockholm (SE)

(*) Notice: Subject to any disclaimer, the term of this patent is extended or adjusted under 35 U.S.C. 154(b) by 330 days.

(21) Appl. No.: 14/135,225

(22) Filed: Dec. 19, 2013

(65) Prior Publication Data
US 2015/0088899 A1  Mar. 26, 2015

Related U.S. Application Data

(60) Provisional application No. 61/881,353, filed on Sep. 23, 2013.

(51) Int. Cl.
G06F 17/30 (2006.01)
G06F 7/00 (2006.01)
H04L 29/06 (2006.01)

(52) U.S. Cl.
CPC ........ H04L 65/60 (2013.01); G06F 17/30321 (2013.01); H04L 65/608 (2013.01)

(58) Field of Classification Search
CPC ......... G06F 17/30864; G06F 17/30321; G06F 17/30613; G06F 17/30961; G06F 17/30067
(Continued)

(56) References Cited

U.S. PATENT DOCUMENTS 5,682,207 A 10/1997 Takeda et al.
5,896,128 A  4/1999 Boyer
(Continued)

FOREIGN PATENT DOCUMENTS

EP 1672923 A1 6/2006
EP 1775953 A1 4/2007
(Continued)

OTHER PUBLICATIONS

Hoffert, Office Action U.S. Appl. No. 14/165,508, dated Jan. 5, 2015, 24 pgs.
(Continued)

*Primary Examiner* — Usmaan Saeed
*Assistant Examiner* — Raquel Perez-Arroyo
(74) *Attorney, Agent, or Firm* — Morgan, Lewis & Bockius LLP

(57) ABSTRACT

An electronic device with one or more processors, memory and a display obtains a file header for a file that corresponds to a plurality of separately indexed clusters. The file is divided into segments one or more of which include multiple sequential clusters. The file header includes a segment index that enables identification of a segment that includes requested content. The device receives a request to seek to a respective position within the file. In response, the device identifies a first segment that includes content that corresponds to the respective position based on the segment index, obtains the first segment, and obtains a content index for a respective cluster within the first segment. After obtaining the first segment and the content index, the device identifies respective content within the respective cluster that corresponds to the respective position based on a content index and provides the respective content to a user.

19 Claims, 18 Drawing Sheets

(58) Field of Classification Search
USPC .................................................. 707/741
See application file for complete search history.

(56) References Cited

U.S. PATENT DOCUMENTS

| | | |
|---|---|---|
| 6,208,354 B1 | 3/2001 | Porter |
| 6,384,869 B1 | 5/2002 | Sciammarella et al. |
| 6,590,618 B1 | 7/2003 | Park et al. |
| 6,671,453 B2 | 12/2003 | Yagura et al. |
| 6,804,824 B1 | 10/2004 | Potrebic et al. |
| 6,919,929 B1 | 7/2005 | Iacobelli et al. |
| 7,165,050 B2 | 1/2007 | Marking |
| 7,519,223 B2 | 4/2009 | Dehlin et al. |
| 7,797,713 B2 | 9/2010 | Dawson et al. |
| 8,146,019 B2 | 3/2012 | Kim et al. |
| 8,214,619 B1 | 7/2012 | Connolly |
| 8,340,654 B2 | 12/2012 | Bratton |
| 8,341,662 B1 | 12/2012 | Bassett et al. |
| 8,341,681 B2 | 12/2012 | Walter et al. |
| 8,434,006 B2 | 4/2013 | Profitt |
| 8,532,464 B2 | 9/2013 | Randall |
| 8,564,728 B2 | 10/2013 | Petersson et al. |
| 8,606,954 B1 | 12/2013 | Abidogun et al. |
| 8,683,377 B2 | 3/2014 | Zuverink et al. |
| 8,736,557 B2 | 5/2014 | Chaudhri |
| 8,908,110 B2 | 12/2014 | Yamashita et al. |
| 9,032,412 B1 | 5/2015 | Davidson et al. |
| 9,071,798 B2 | 6/2015 | Hoffert et al. |
| 2001/0003846 A1 | 6/2001 | Rowe et al. |
| 2001/0030660 A1 | 10/2001 | Zainoulline |
| 2002/0089587 A1 | 7/2002 | White et al. |
| 2002/0116701 A1 | 8/2002 | Asada et al. |
| 2004/0003399 A1 | 1/2004 | Cooper |
| 2004/0056885 A1 | 3/2004 | Azami et al. |
| 2004/0221306 A1 | 11/2004 | Noh |
| 2004/0261127 A1 | 12/2004 | Freeman et al. |
| 2005/0114885 A1 | 5/2005 | Shikata et al. |
| 2005/0138658 A1 | 6/2005 | Bryan |
| 2005/0234992 A1 | 10/2005 | Haberman |
| 2006/0015904 A1 | 1/2006 | Marcus |
| 2006/0061688 A1 | 3/2006 | Choi |
| 2006/0075428 A1 | 4/2006 | Farmer et al. |
| 2006/0155952 A1 | 7/2006 | Haas et al. |
| 2006/0159184 A1 | 7/2006 | Jang |
| 2006/0218250 A1 | 9/2006 | Nakase |
| 2006/0245605 A1 | 11/2006 | Matsunaga |
| 2006/0259877 A1 | 11/2006 | Kaminagayoshi |
| 2006/0282864 A1 | 12/2006 | Gupte |
| 2007/0028270 A1 | 2/2007 | Ostojic et al. |
| 2007/0067815 A1 | 3/2007 | Bowen et al. |
| 2007/0083911 A1 | 4/2007 | Madden et al. |
| 2007/0169156 A1 | 7/2007 | Zeng |
| 2007/0263066 A1 | 11/2007 | Henning et al. |
| 2008/0056273 A1* | 3/2008 | Pelletier .................. H04L 69/04 370/395.21 |
| 2008/0074550 A1 | 3/2008 | Park |
| 2008/0126294 A1 | 5/2008 | Ray |
| 2008/0126919 A1 | 5/2008 | Uskali et al. |
| 2008/0155459 A1 | 6/2008 | Ubillos |
| 2008/0242280 A1 | 10/2008 | Shapiro et al. |
| 2008/0244092 A1 | 10/2008 | Kosaka |
| 2009/0010324 A1 | 1/2009 | Yamamoto |
| 2009/0046545 A1 | 2/2009 | Blinnikka |
| 2009/0055506 A1* | 2/2009 | Hudson .................. D01D 5/423 709/208 |
| 2009/0100380 A1 | 4/2009 | Gardner et al. |
| 2009/0119594 A1 | 5/2009 | Hannuksela |
| 2009/0132599 A1* | 5/2009 | Soroushian ....... G06F 17/30017 |
| 2009/0195515 A1 | 8/2009 | Lee |
| 2009/0198827 A1 | 8/2009 | Hughes |
| 2009/0234967 A1 | 9/2009 | Yu et al. |
| 2009/0235170 A1 | 9/2009 | Golden |
| 2009/0297123 A1* | 12/2009 | Virdi .................. H04N 21/2358 386/241 |
| 2010/0049864 A1 | 2/2010 | Lu et al. |
| 2010/0066918 A1 | 3/2010 | Gupta et al. |
| 2010/0077441 A1 | 3/2010 | Thomas et al. |
| 2010/0095240 A1 | 4/2010 | Shiplacoff et al. |
| 2010/0153999 A1 | 6/2010 | Yates |
| 2010/0162180 A1 | 6/2010 | Dunnam et al. |
| 2010/0175026 A1 | 7/2010 | Bortner et al. |
| 2010/0180297 A1 | 7/2010 | Levine et al. |
| 2010/0191859 A1 | 7/2010 | Raveendran |
| 2010/0235733 A1 | 9/2010 | Drislane et al. |
| 2010/0235746 A1 | 9/2010 | Anzures |
| 2010/0287586 A1 | 11/2010 | Walter et al. |
| 2010/0306401 A1 | 12/2010 | Gilson |
| 2010/0332453 A1 | 12/2010 | Prahlad |
| 2011/0029874 A1 | 2/2011 | Profitt |
| 2011/0066703 A1 | 3/2011 | Kaplan et al. |
| 2011/0090402 A1 | 4/2011 | Huntington et al. |
| 2011/0119611 A1 | 5/2011 | Ahn et al. |
| 2011/0119711 A1 | 5/2011 | Marshall et al. |
| 2011/0119712 A1 | 5/2011 | Choi et al. |
| 2011/0242002 A1 | 10/2011 | Kaplan et al. |
| 2011/0252183 A1 | 10/2011 | Cho |
| 2011/0289139 A1 | 11/2011 | Mcintosh et al. |
| 2011/0289534 A1 | 11/2011 | Jordan et al. |
| 2011/0296351 A1 | 12/2011 | Ewing, Jr. et al. |
| 2012/0030619 A1 | 2/2012 | Lee et al. |
| 2012/0050616 A1 | 3/2012 | Anderson et al. |
| 2012/0054679 A1 | 3/2012 | Ma et al. |
| 2012/0079429 A1 | 3/2012 | Stathacopoulos et al. |
| 2012/0131459 A1 | 5/2012 | Ilama-Vaquero et al. |
| 2012/0137216 A1 | 5/2012 | Choi |
| 2012/0141095 A1 | 6/2012 | Schwesinger et al. |
| 2012/0158802 A1 | 6/2012 | Lakshmanan et al. |
| 2012/0170903 A1 | 7/2012 | Shirron et al. |
| 2012/0180090 A1 | 7/2012 | Yoon et al. |
| 2012/0182384 A1 | 7/2012 | Anderson et al. |
| 2012/0204106 A1 | 8/2012 | Hill et al. |
| 2012/0213295 A1 | 8/2012 | Quere et al. |
| 2012/0216117 A1 | 8/2012 | Arriola et al. |
| 2012/0221950 A1 | 8/2012 | Chao et al. |
| 2012/0254793 A1 | 10/2012 | Briand et al. |
| 2012/0254926 A1 | 10/2012 | Takahashi et al. |
| 2012/0257120 A1 | 10/2012 | Nakai |
| 2012/0290933 A1 | 11/2012 | Rajaraman et al. |
| 2012/0311444 A1 | 12/2012 | Chaudhri |
| 2012/0323917 A1 | 12/2012 | Mercer et al. |
| 2013/0016129 A1 | 1/2013 | Gossweiler, III et al. |
| 2013/0061045 A1* | 3/2013 | Kiefer .................. H04L 9/0819 713/160 |
| 2013/0080895 A1 | 3/2013 | Rossman et al. |
| 2013/0132605 A1 | 5/2013 | Kocks et al. |
| 2013/0145268 A1 | 6/2013 | Kukulski |
| 2013/0152129 A1 | 6/2013 | Alberth et al. |
| 2013/0179925 A1 | 7/2013 | Woods et al. |
| 2013/0222274 A1 | 8/2013 | Mori et al. |
| 2013/0236158 A1 | 9/2013 | Lynch et al. |
| 2013/0263047 A1 | 10/2013 | Allen et al. |
| 2013/0265501 A1 | 10/2013 | Murugesan et al. |
| 2013/0275924 A1 | 10/2013 | Weinberg et al. |
| 2013/0279375 A1 | 10/2013 | Newberg |
| 2013/0282917 A1 | 10/2013 | Reznik et al. |
| 2013/0283154 A1 | 10/2013 | Sasakura |
| 2013/0293454 A1 | 11/2013 | Jeon et al. |
| 2013/0305307 A1 | 11/2013 | Nagahama |
| 2013/0307792 A1 | 11/2013 | Andres et al. |
| 2013/0309986 A1 | 11/2013 | Cox et al. |
| 2013/0332835 A1 | 12/2013 | Mace |
| 2013/0346867 A1* | 12/2013 | Woods .................. G11B 27/34 715/728 |
| 2014/0032781 A1 | 1/2014 | Casey et al. |
| 2014/0059479 A1 | 2/2014 | Hamburg et al. |
| 2014/0082497 A1 | 3/2014 | Chalouhi et al. |
| 2014/0098140 A1 | 4/2014 | Tran et al. |
| 2014/0108929 A1 | 4/2014 | Garmark et al. |
| 2014/0114985 A1 | 4/2014 | Mok et al. |
| 2014/0143725 A1 | 5/2014 | Lee |
| 2014/0157124 A1 | 6/2014 | Roberts et al. |
| 2014/0164984 A1 | 6/2014 | Farouki |
| 2014/0173027 A1 | 6/2014 | Kappes |
| 2014/0176479 A1 | 6/2014 | Wardenaar |

(56) References Cited

U.S. PATENT DOCUMENTS

| | | | |
|---|---|---|---|
| 2014/0178047 A1 | 6/2014 | Apodaca et al. | |
| 2014/0185466 A1 | 7/2014 | Syed et al. | |
| 2014/0215303 A1 | 7/2014 | Grigorovitch | |
| 2014/0280433 A1 | 9/2014 | Messerli | |
| 2014/0282281 A1 | 9/2014 | Ram et al. | |
| 2015/0006662 A1* | 1/2015 | Braness | H04L 65/4084 709/213 |
| 2015/0089075 A1 | 3/2015 | Strigeus | |

FOREIGN PATENT DOCUMENTS

| | | |
|---|---|---|
| EP | 2469841 A1 | 6/2012 |
| WO | WO 2004/019530 A1 | 3/2004 |
| WO | WO 2009/088952 A1 | 7/2009 |
| WO | WO 2011/095693 A1 | 8/2011 |
| WO | WO 2013/022486 A1 | 2/2013 |

OTHER PUBLICATIONS

Hoffert, Office Action U.S. Appl. No. 14/165,518, dated Feb. 11, 2016, 15 pgs.
Hoffert, Office Action U.S. Appl. No. 14/133,358, dated Mar. 3, 2016, 21 pgs.
Hoffert, Office Action U.S. Appl. No. 14/165,513, dated Mar. 27, 2015, 16 pgs.
Hoffert, Notice of Allowance, U.S. Appl. No. 14/165,517, dated Apr. 28, 2015, 6 pgs.
Hoffert, Notice of Allowance U.S. Appl. No. 14/222,299, dated Apr. 13, 2015, 8 pgs.
ISO/IEC 14496-12, dated Oct. 1, 2005, International Standard, ISO/IEC, XP55178146, 94 pgs.
Siglin, "Unifying Global Video Strategies, MP4 File Fragmentation for Broadcast, Mobile and Web Delivery," A Transitions in Technology White Paper, Nov. 16, 2011, 16 pgs.
Spotify AB, International Search Report and Written Opinion, PCTIB/2014/002831, dated Mar. 19, 2015, 11 pgs.
Spotify AB, Invitation to Pay Additional Fees and Partial Search Report, PCTIB/2014002726, dated Mar. 31, 2015, 8 pgs.
Zambelli, Alex, "IIS Smooth Streaming Technical Overview," Mar. 1, 2009, Microsoft Corporation, downloaded from http://dfpcorec-p.international.epo.org/wf/storage/14C3247F2EA000308DF/originalPdf, 8 pgs.
Hoffert, Final Office Action, U.S. Appl. No. 14/165,513, dated Jul. 16, 2015, 16 pgs.
Spotify AB, International Search Report and Written Opinion, PCT/IB2014/002726, dated Jun. 8, 2015, 20 pgs.
Hoffert, Office Action U.S. Appl. No. 14/165,508, dated Apr. 21, 2014, 17pgs.
Hoffert, Office Action U.S. Appl. No. 14/165,514, dated May 9, 2014, 21 pgs.
Hoffert, Office Action U.S. Appl. No. 14/165,512, dated May 28, 2014, 19 pgs.
Hoffert, Office Action U.S. Appl. No. 14/165,517, dated May 28, 2014, 18 pgs.
Hoffert, Office Action U.S. Appl. No. 14/165,507, dated May 14, 2014, 18 pgs.
Hoffert, Office Action U.S. Appl. No. 14/165,513, dated Jun. 6, 2014, 13 pgs.
Hoffert, Office Action U.S. Appl. No. 14/222,299, dated Jul. 3, 2014, 35 pgs.
Hoffert, Office Action U.S. Appl. No. 14/165,514, dated Mar. 3, 2015, 19 pgs.
Hoffert, Notice of Allowance U.S. Appl. No. 14/165,512, dated Mar. 2, 2015, 6 pgs.
Hoffert, Notice of Allowance, U.S. Appl. No. 14/165,517, dated Jan. 21, 2015, 6 pgs.
Hoffert, Notice of Allowance, U.S. Appl. No. 14/165,508, dated Mar. 2, 2015, 5 pgs.
Hoffert, Notice of Allowance U.S. Appl. No. 14/165,507, dated Mar. 16, 2015, 17 pgs.
Spotify AB, International Search Report, PCTUS2014/042571, dated 12, 2014, 6 pgs.
Hoffert, Final Office Action U.S. Appl. No. 14/165,514, dated Aug. 21, 2015, 20 pgs.
Hoffert, Office Action U.S. Appl. No. 14/133,333, dated Sep. 15, 2015, 20 pgs.
Hoffert, Office Action U.S. Appl. No. 14/133,340, dated Sep. 15, 2015, 19 pgs.
Strigeus, Office Action, U.S. Appl. No. 14/135,217, dated Aug. 26, 2015, 19 pgs.
Strigeus, Office Action, U.S. Appl. No. 14/135,230, dated Oct. 1, 2015, 15 pgs.
Hoffert, Final Office Action U.S. Appl. No. 14/165,508, dated Sep. 22, 2014, 24 pgs.
Hoffert, Final Office Action U.S. Appl. No. 14/165,514, dated Oct. 23, 2014, 23 pgs.
Hoffert, Final Office Action U.S. Appl. No. 14/165,513, dated Nov. 7, 2014, 14 pgs.
Hoffert, Notice of Allowance U.S. Appl. No. 14/165,512, dated Oct. 14, 2014, 5 pgs.
Hoffert, Final Office Action U.S. Appl. No. 14/165,517, dated Oct. 7, 2014, 7 pgs.
Hoffert, Final Office Action U.S. Appl. No. 14/165,507, dated Oct. 22, 2014, 20 pgs.
Spotify AB, Invitation to Pay Additional Fees and Partial ISR, PCTUS2014/042571, dated Sep. 24, 2014, 6 pgs.
Hoffert, Office Action U.S. Appl. No. 14/165,514, dated Nov. 20, 2015, 20 pgs.
Hoffert, Final Office Action U.S. Appl. No. 14/222,299, dated Nov. 28, 2014, 45 pgs.
Spotify AB, International Preliminary Report on Patentability, PCTUS2014/042571, dated Dec. 22, 2015, 12 pgs.
Hoffert, Office Action U.S. Appl. No. 14/165,513, dated Mar. 18, 2016, 17 pgs.
Hoffert, Final Office Action U.S. Appl. No. 14/133,340, dated Apr. 6, 2016, 21 pgs.
Hoffert, Office Action U.S. Appl. No. 14/134,950, dated Apr. 5, 2016, 17 pgs.
Hoffert, Notice of Allowance, U.S. Appl. No. 14/743,684, dated Sep. 23, 2016, 8 pgs.
Strigeus, Final Office Action, U.S. Appl. No. 14/135,217, dated May 20, 2016, 11 pgs.
Hoffert, Notice of Allowance U.S. Appl. No. 14/165,518, dated Jan. 13, 2017, 17 pgs.
Hoffert, Office Action U.S. Appl. No. 14/133,333, dated Jan. 27, 2017, 22 pgs.
Hoffert, Office Action U.S. Appl. No. 14/133,340, dated Jan. 18, 2017, 21 pgs.
Hoffert, Final Office Action U.S. Appl. No. 14/133,352, dated Dec. 1, 2016, 26 pgs.
Hoffert, Notice of Allowance, U.S. Appl. No. 14/133,352, dated Mar. 28, 2017, 24 pgs.
Hoffert, Notice of Allowance U.S. Appl. No. 14/134,950, dated Oct. 3, 2016, 10 pgs.
Hoffert, Notice of Allowance, U.S. Appl. No. 14/805,323, dated Oct. 3, 2016, 9 pgs.
Hoffert, Notice of Allowance U.S. Appl. No. 14/720,525, dated Jan. 31, 2017, 8 pgs.
Hoffert, Notice of Allowance, U.S. Appl. No. 14/743,694, dated Dec. 19, 2016, 5 pgs.
Strigeus, Office Action, U.S. Appl. No. 14/135,230, dated Nov. 3, 2016, 15 pgs.
Strigeus, Notice of Allowance, U.S. Appl. No. 14/135,230, dated Mar. 23, 2017, 8 pgs.
Strigeus, Office Action, U.S. Appl. No. 14/135,217, dated Jan. 9, 2017, 6 pgs.
Hoffert, Office Action U.S. Appl. No. 14/743,702, dated May 17, 2017, 12 pgs.
Hoffert, Final Office Action U.S. Appl. No. 14/133,333, dated Jul. 3, 2017, 20 pgs.

(56) References Cited

OTHER PUBLICATIONS

Strigeus, Notice of Allowance, U.S. Appl. No. 14/135,217, dated May 24, 2017, 9 pgs.
Hoffert, Final Office Action U.S. Appl. No. 14/165,514, dated Jun. 1, 2016, 21 pgs.
Hoffert, Notice of Allowance U.S. Appl. No. 14/165,518, dated Jun. 7, 2016, 8 pgs.
Hoffert, Final Office Action U.S. Appl. No. 14/165,513, dated Aug. 11, 2016, 16 pgs.
Hoffert, Office Action U.S. Appl. No. 14/133,352, dated May 31, 2016, 23 pgs.
Hoffert, Office Action U.S. Appl. No. 14/805,323, dated Apr. 20, 2016, 6 pgs.
Hoffert, Office Action U.S. Appl. No. 14/743,684, dated Apr. 14, 2016, 7 pgs.
Hoffert, Office Action U.S. Appl. No. 14/720,525, dated Aug. 22, 2016, 17 pgs.
Hoffert, Office Action U.S. Appl. No. 14/743,694, dated Aug. 24, 2016, 6 pgs.
Spotify AB, International Preliminary Report on Patentability, PCTIB/2014/002831, dated Apr. 19, 2016, 8 pgs.
Spotify AB, Communication Pursuant to Rules 161(1) and 162, EP14828273-4, dated May 23, 2016, 2 pgs.
Spotify AB, Communication Pursuant to Rules 161(1) and 162, EP14831065.9, dated Jun. 3, 2016, 2 pgs.
Strigeus, Final Office Action, U.S. Appl. No. 14/135,230, dated Jun. 1, 2016, 16 pgs.

* cited by examiner

Segment Source Table 440

| Segment ID 420-1 | S1 | S5 | S9 | S22 |
|---|---|---|---|---|
| Segment ID 420-2 | S1 | S2 | S13 | S37 |
| ••• | | | | |
| Segment ID 420-n | S4 | S6 | S8 | S10 |

Figure 4B

| Segment 1 | File Header 402 | C1 | C2 | C3 | C4 | C5 | C6 | C7 | C8 |
|---|---|---|---|---|---|---|---|---|---|

| Segment 2 | C9 | C10 | C11 | C12 | C13 | C14 | C15 | C16 |
|---|---|---|---|---|---|---|---|---|

| Segment 3 | C17 | C18 | C19 | C20 | C21 | C22 | C23 | C24 |
|---|---|---|---|---|---|---|---|---|

Figure 4C

SYSTEM AND METHOD FOR IDENTIFYING A SEGMENT OF A FILE THAT INCLUDES TARGET CONTENT

RELATED APPLICATIONS

This application claims priority to U.S. Provisional Patent Application Ser. No. 61/881,353, filed Sep. 23, 2013, entitled "System and Method for Efficiently Providing Media and Associated Metadata," which application is incorporated by reference in its entirety.

This application is related to U.S. Provisional Patent Application Ser. No. 61/836,079, filed Jun. 17, 2013, entitled "System and Method for Switching Between Media Streams while Providing a Seamless User Experience;" U.S. Provisional Patent Application Ser. No. 61/861,330, filed Aug. 1, 2013, entitled "Transitioning from Decompressing One Compressed Media Stream to Decompressing another Media Stream;" and U.S. Provisional Patent Application Ser. No. 61/892,343, filed Oct. 17, 2013, entitled "System and Method for Switching between Media Items in a Plurality of Sequences of Media Items," which applications are incorporated by reference in their entireties.

TECHNICAL FIELD

The disclosed implementations herein relate generally to providing media content and, more particularly, to searching or seeking within media content.

BACKGROUND

As computer technology has improved and become ubiquitous, users increasingly are able to use computer based devices to consume media content. For example, users can listen to audio content or watch video content on a variety of computer based electronic devices. In addition, advances in network technology have increased the speed and reliability with which information can be transmitted over computer networks. As such, it is possible to stream media data over computer networks as needed rather than transmitting a file in a physical media, such as a CD or DVD, or downloading the entire file before consuming the media content.

SUMMARY

Despite the advances in networking speed and reliability, some solutions for streaming, or otherwise accessing, media are sometimes cumbersome and involve excessive loading times. This is especially true when a user attempts to seek to a position within media content. In such circumstances, upon beginning playback or streaming media content, a user cannot instantaneously (or quickly) seek within the media content, and the user will likely experience frequent breaks to load content that degrade the user's experience.

Accordingly, there is a need for a method or a media content container to reduce the upfront time needed to seek within media content to provide a more seamless user experience. Such methods and systems may complement or replace conventional methods for seeking within media content. Such methods and systems enhance the user experience as the user is able to seek media content quickly and without excessive loading delays.

In accordance with some implementations, a method of seeking within media content is disclosed herein. The method is performed at an electronic device (e.g., a client device) with one or more processors and memory. The method includes: obtaining a file header for a file that corresponds to a plurality of clusters, where the file header includes a cluster index that enables coarse searching (e.g., keyframe-based seeking for video content) within the file; and receiving a request to seek to a respective position within the file. In response to receiving the request, the method includes: identifying a cluster of the plurality of clusters that includes content that corresponds to the respective position based on the cluster index; obtaining a cluster header associated with the cluster based on information retrieved from the cluster index, where the cluster header includes a content index that enables fine searching (e.g., frame-based seeking for video content) within the cluster; obtaining cluster data associated with the cluster; and after obtaining the cluster header, identifying respective content within the cluster that corresponds to the respective position based on the content index. After identifying the respective content, the method includes providing at least a portion of content corresponding to the file to a presentation device for presentation to a user, starting with the respective content.

In some implementations, respective file portions are compatible with a respective file format when the file portions can be used to generate content in the respective file format. In some implementations, the first file format is a file format used by devices (e.g., portable multifunction devices such as smartphones and tablet computers) that have limited processing resources and are not capable of generating file portions in a different format or can generate file portions in the different format but suffer from a noticeable impact on performance (e.g., reduction in battery life, overheating, lag or stutters in video/audio playback, etc.) to do so; while the second file format is a file format used by devices with greater processing resources (e.g., gaming consoles or personal computers such as desktop or laptop computers) that are capable of generating file portions in a different format using the second modification information without a noticeable impact on performance (e.g., reduction in battery life, overheating, lags or stutters in video/audio playback, etc.). In some implementations, the first client also converts portions of the content based on playback requirements at the first client (e.g., audio content in AAC format is converted to MP3 format or vice versa). In some implementations, in addition to generating file portions that are compatible with the second file format, the second client also converts portions of the content based on playback requirements at the second client (e.g., audio content in AAC format is converted to MP3 format or vice versa).

In accordance with some implementations, a method of providing media content is disclosed herein. The method is performed at a computer system (e.g., a server system) with one or more processors and memory. The method includes obtaining content-access information that enables distribution of content to a plurality of clients having different file format processing capabilities. The method also includes providing to a first client, having first file format processing capabilities, first information that enables the first client to access respective content in a first file format. The method further includes providing to a second client, having second file format processing capabilities different from the first file format processing capabilities, second information that enables the second client to access respective content in a second file format different from the first file format, where: the first information identifies a first set of file portions that can be combined to generate the respective content in the first file format; the second information identifies a second set of file portions that can be combined to generate the respective content in the second file format; and the second set of file portions includes one or more shared file portions that are included in the first set of file portions.

In some implementations, a computer system (e.g., an electronic device or server system) includes one or more processors and memory storing one or more programs for execution by the one or more processors, the one or more programs include instructions for performing the operations of any of the methods described herein. In some implementations, a non-transitory computer readable storage medium storing one or more programs, the one or more programs comprising instructions, which, when executed by a portable electronic device or computer system (e.g., an electronic device or server system) with one or more processors perform, cause the device or system to perform the operations of any of the methods described herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 4B is a block diagram of an example data structure for a segment source table in accordance with some implementations FIG. 4C is a block diagram of an example data structure for a plurality of segments comprising a media file in accordance with some implementations.

DETAILED DESCRIPTION

Figure 1A:
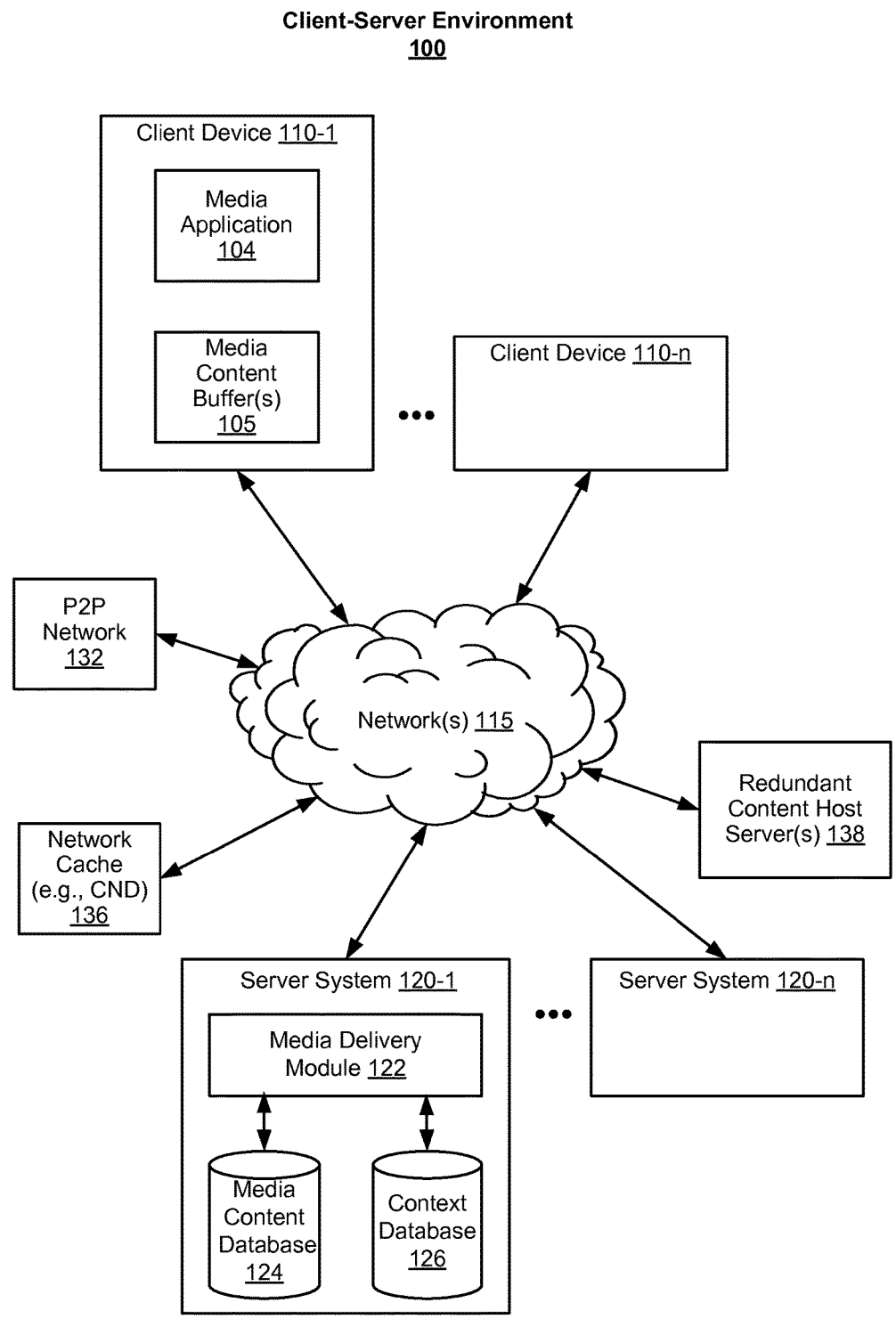
FIG. 1A is a block diagram illustrating a client-server environment in accordance with some implementations.
Figure 1B:
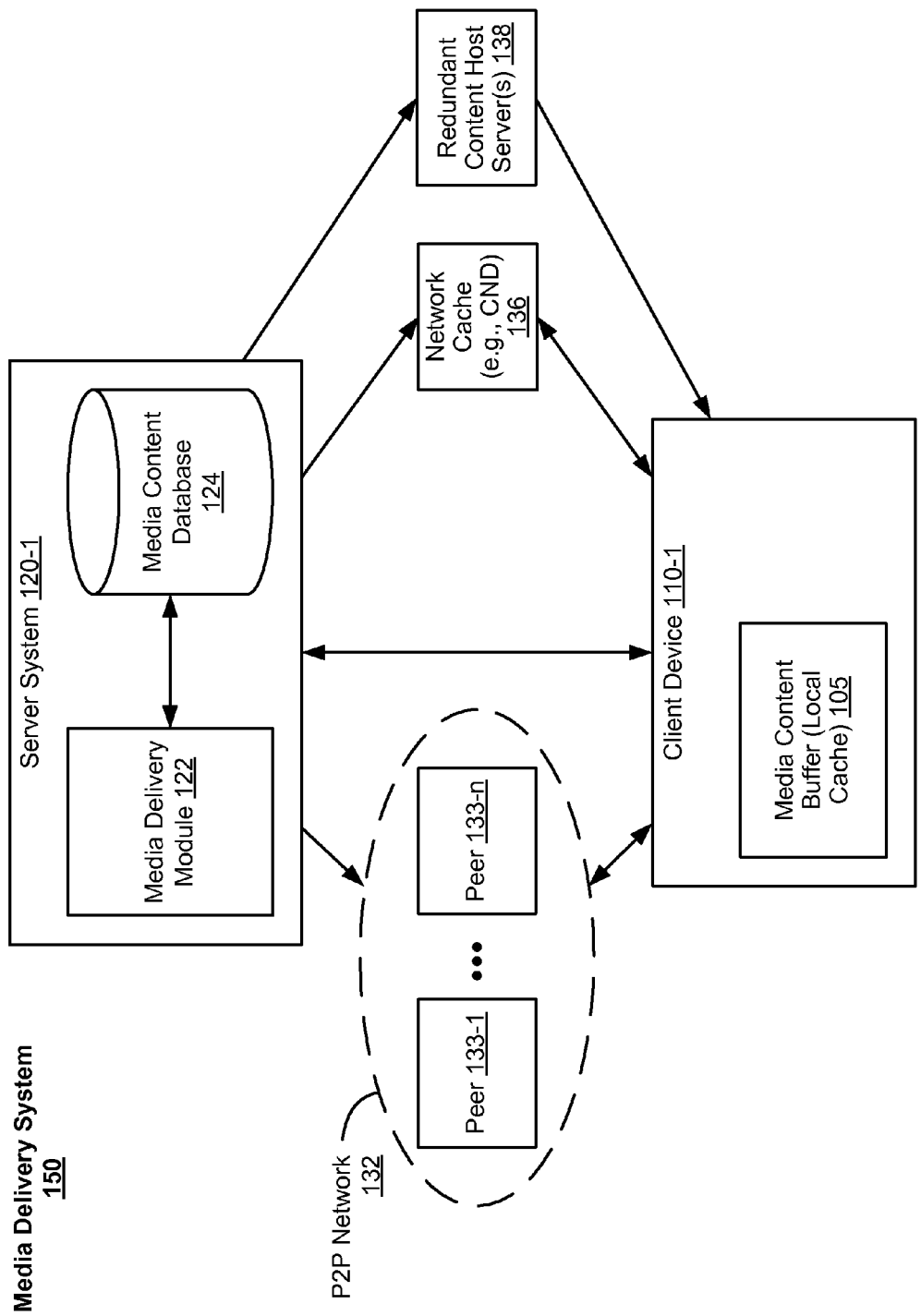
FIG. 1B is a block diagram illustrating a media delivery system in accordance with some implementations.
Figure 2:
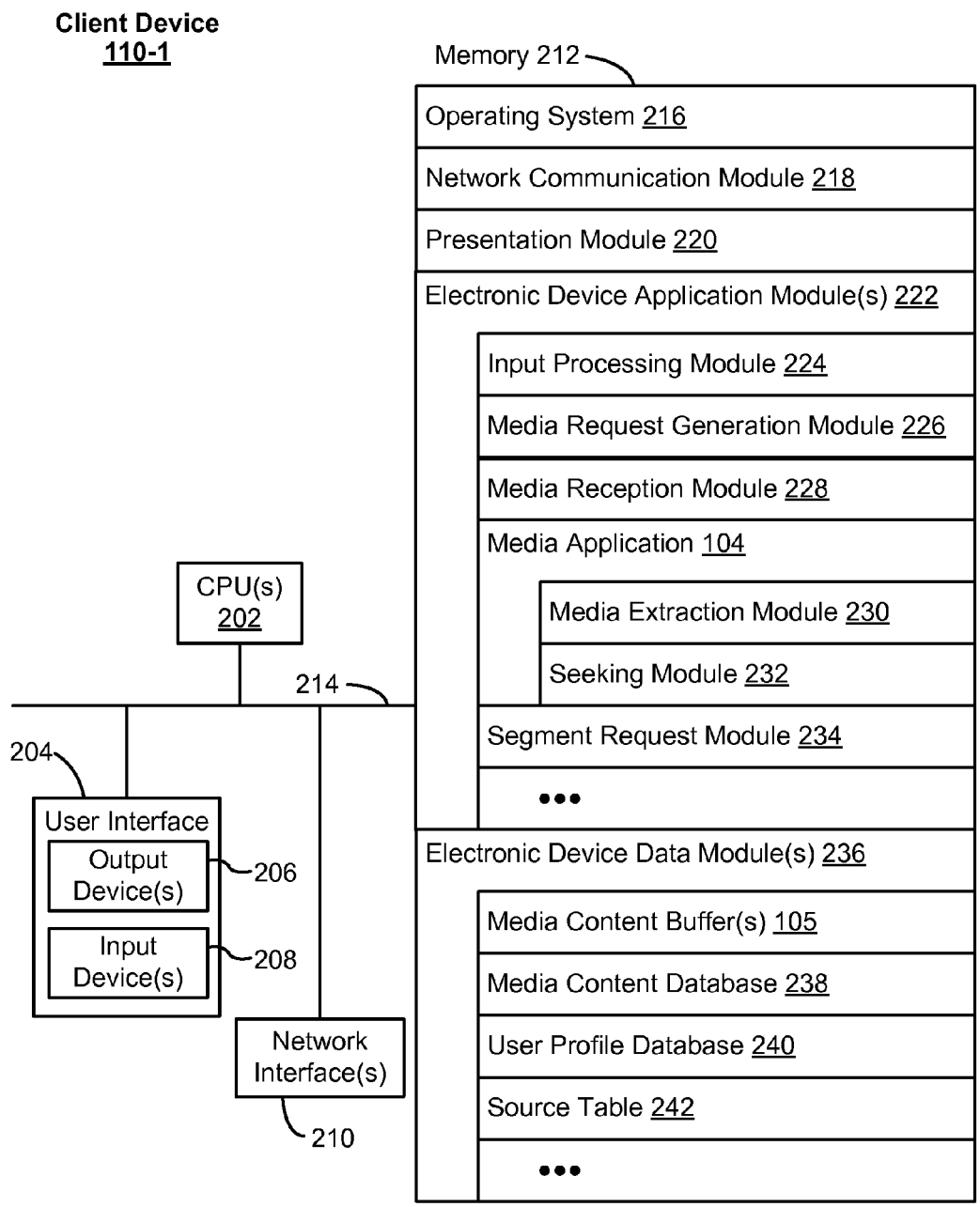
FIG. 2 is a block diagram illustrating a client device in accordance with some implementations.
Figure 3:
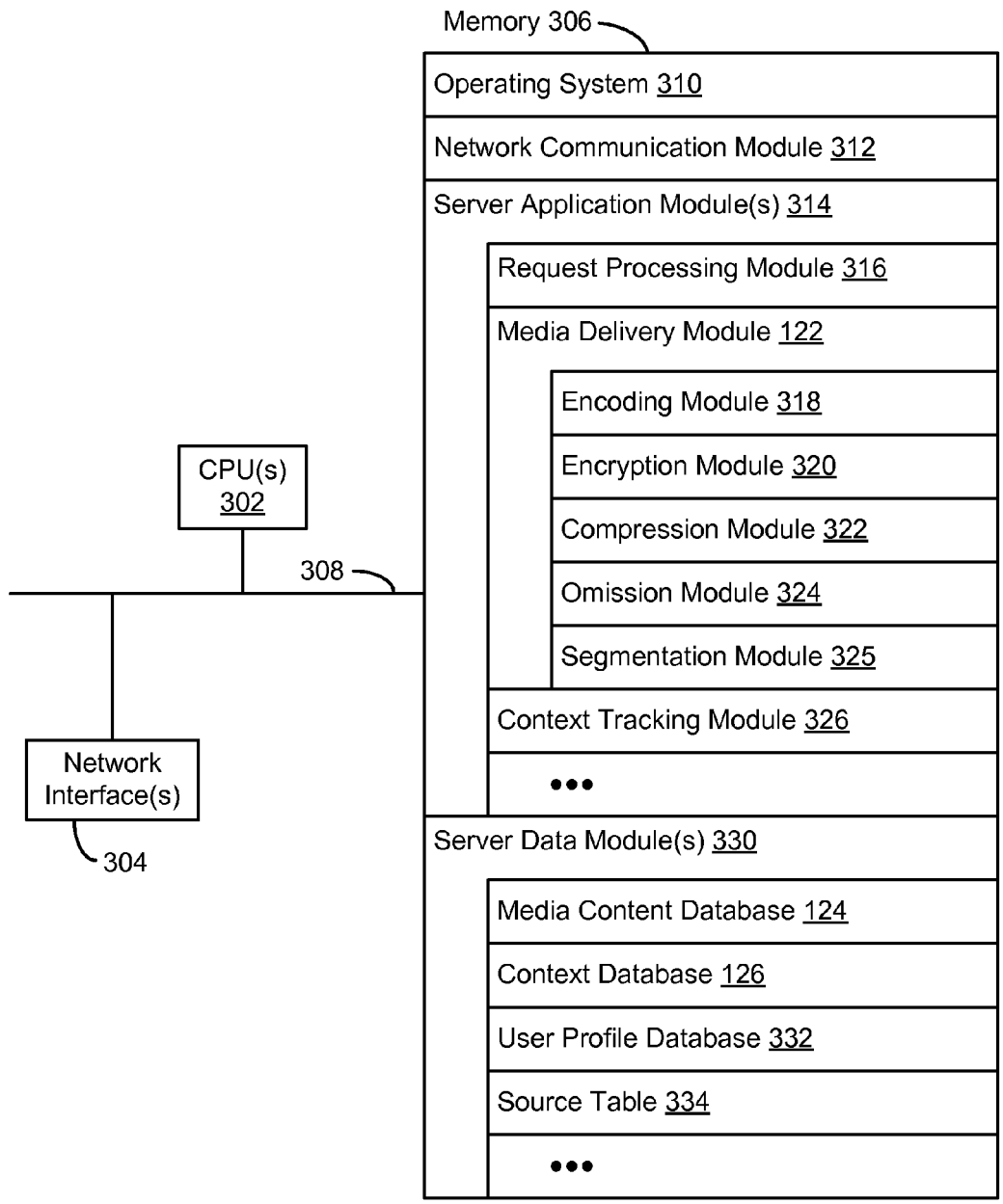
FIG. 3 is a block diagram illustrating a server system in accordance with some implementations.
Figure 4A:
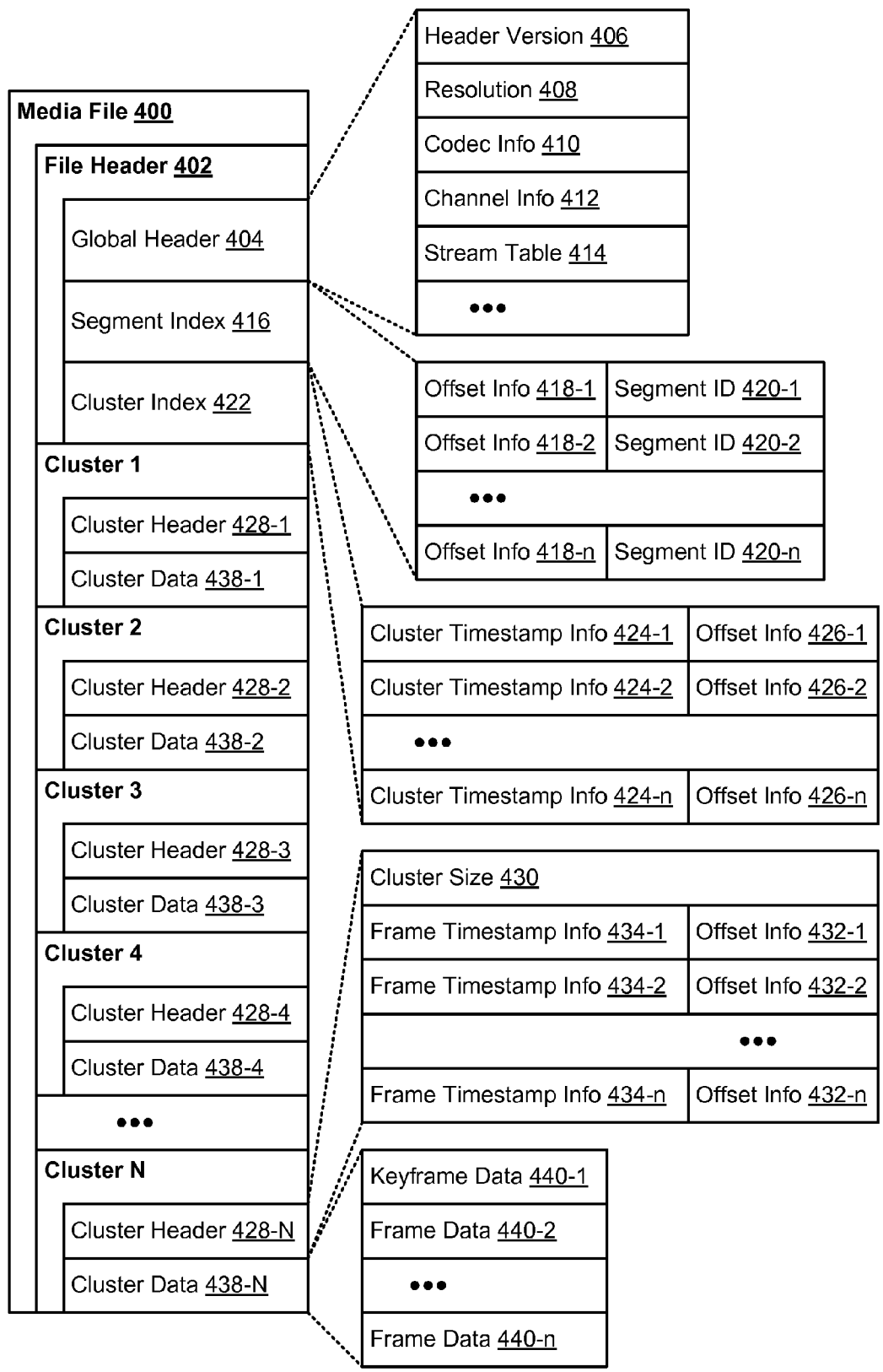
FIG. 4A is a block diagram of a data structure for an example media file in accordance with some implementations.
Figure 5:
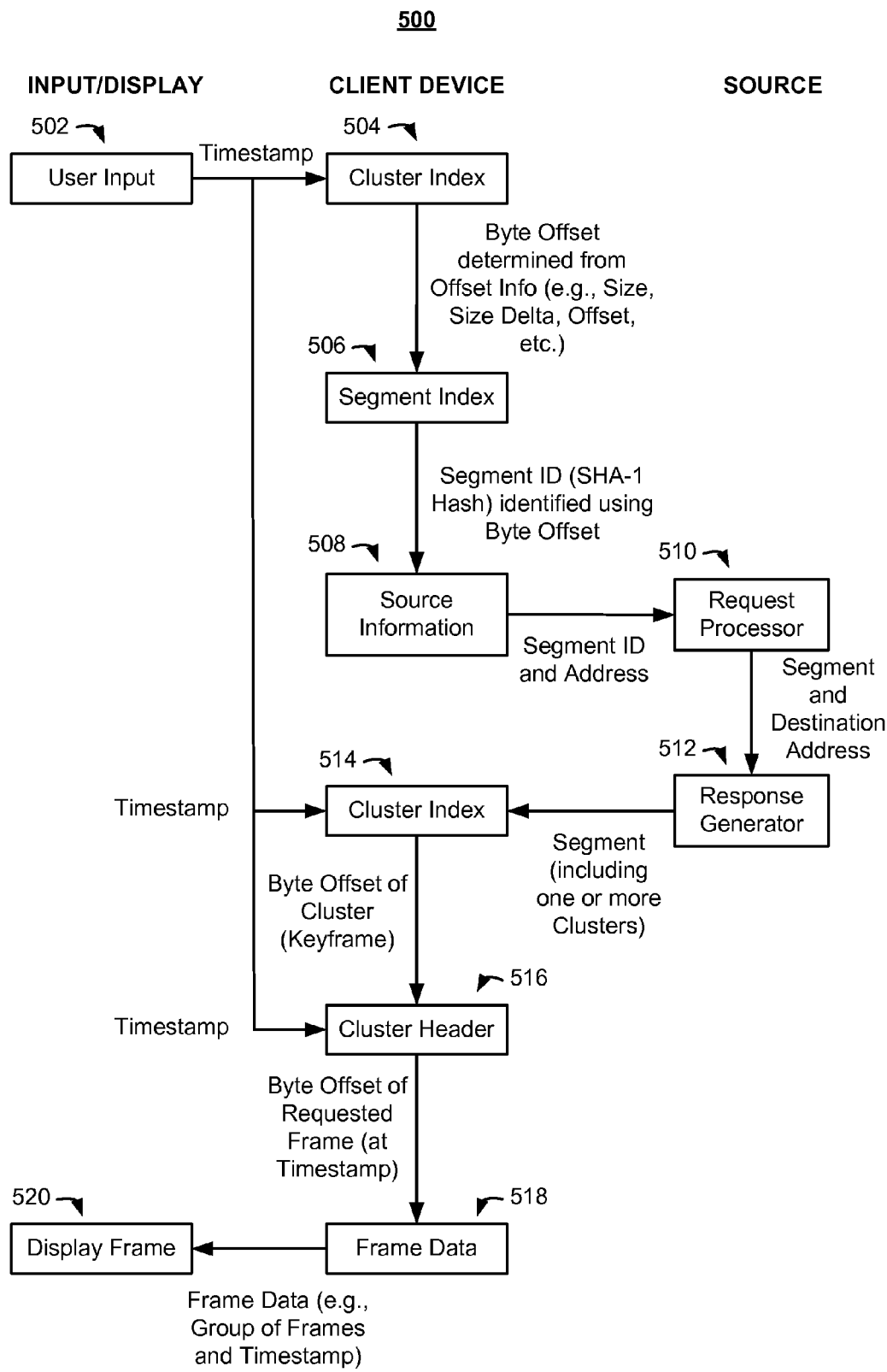
FIG. 5 is a flow diagram illustrating a process for seeking within media content in accordance with some implementations.
Figure 6A:
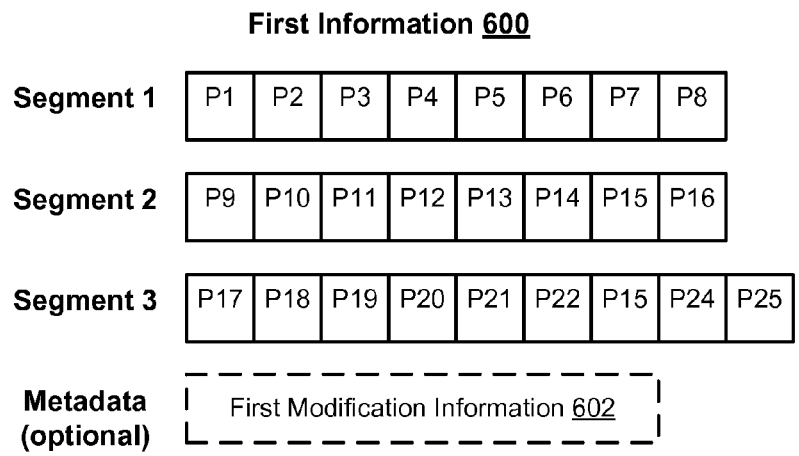
FIG. 6A is a block diagram of an example data structure for a plurality of file portions in accordance with some implementations.
Figure 6B:
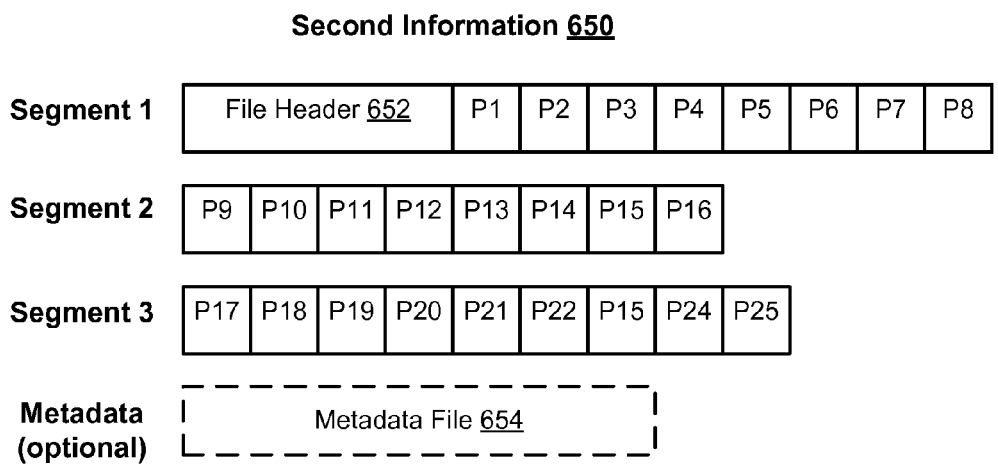
FIG. 6B is a block diagram of an example data structure for a plurality of file portions in accordance with some implementations.
Figure 6C:
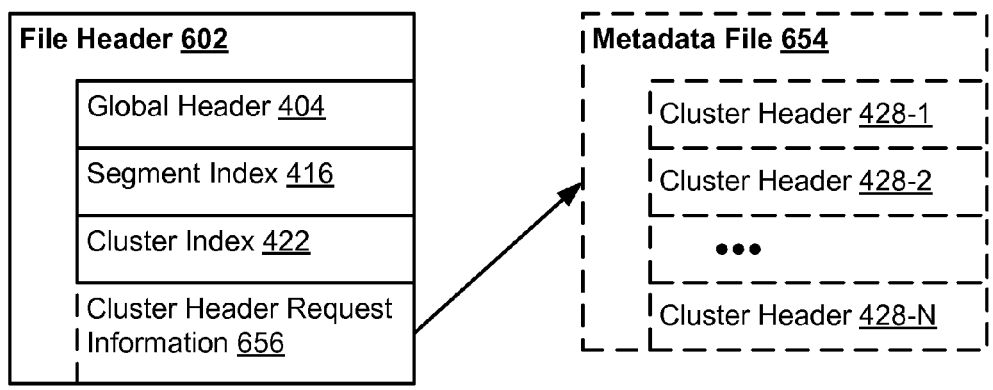
FIG. 6C is a block diagram of an example data structure enabling coarse and/or fine searching within the information in FIG. 6B in accordance with some implementations.
Figure 7A:
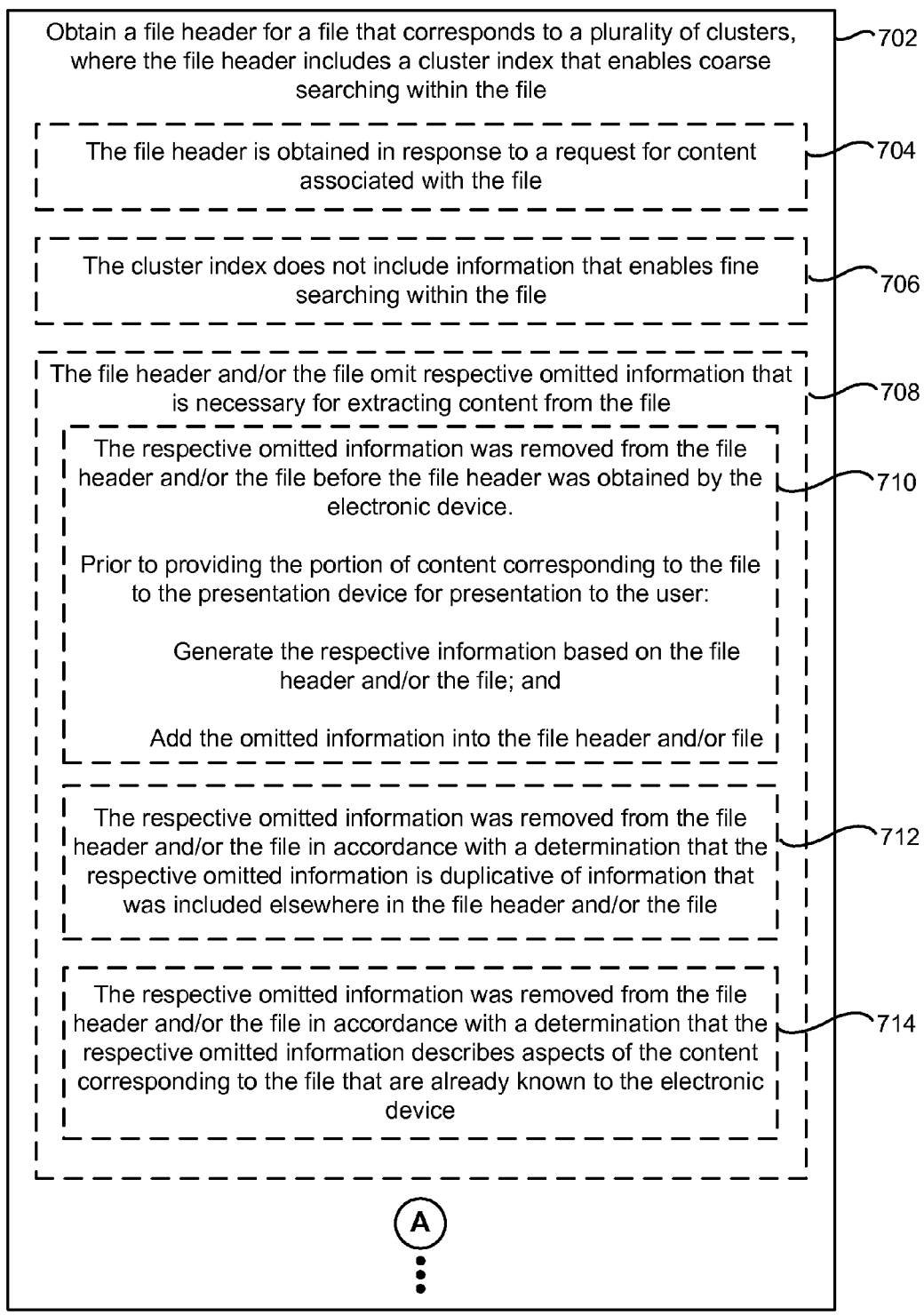
FIGS. 7A-7F are flow diagrams illustrating a method of seeking within media content in accordance with some implementations.
Figure 7B:
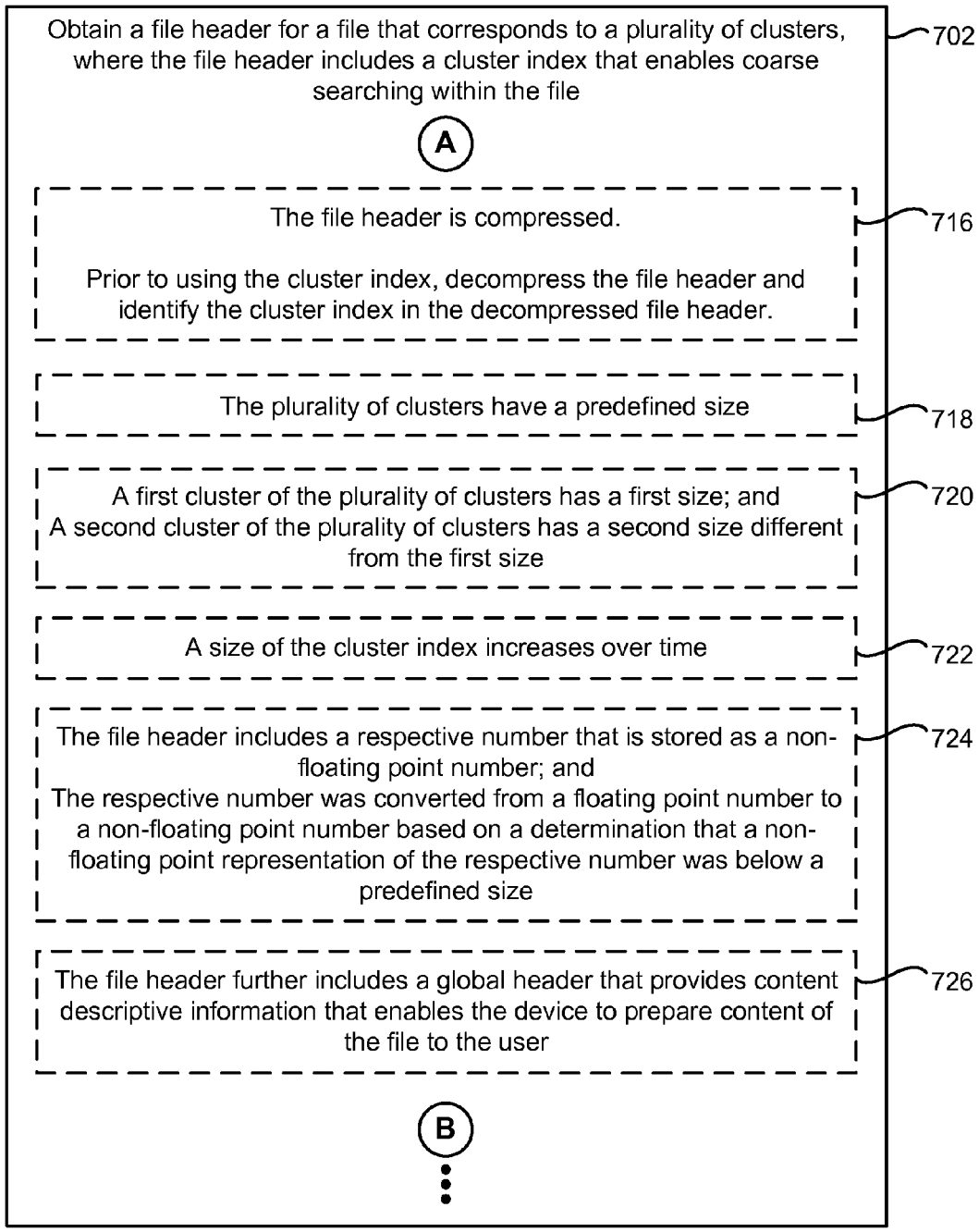
Figure 7C:
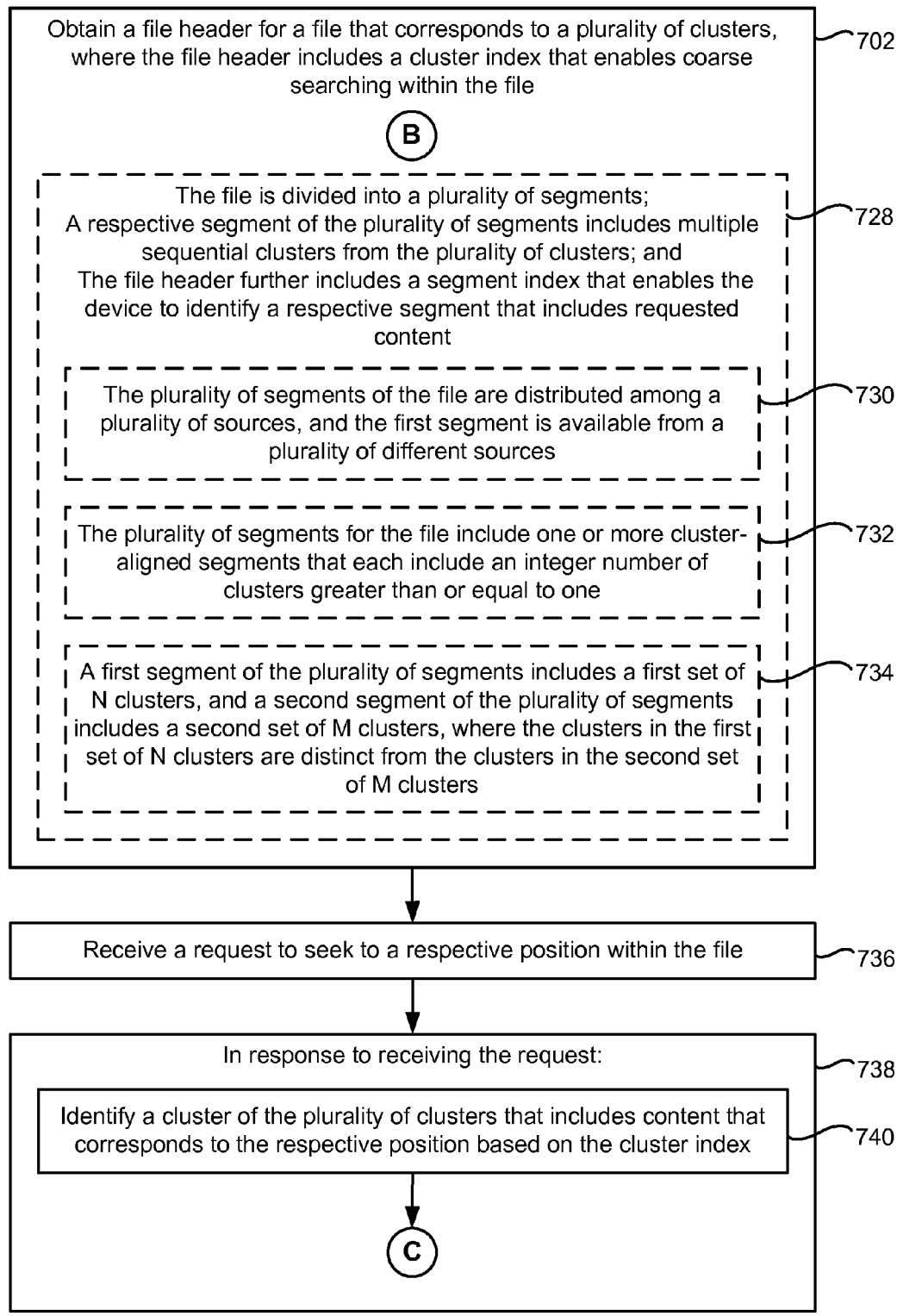
Figure 7D:
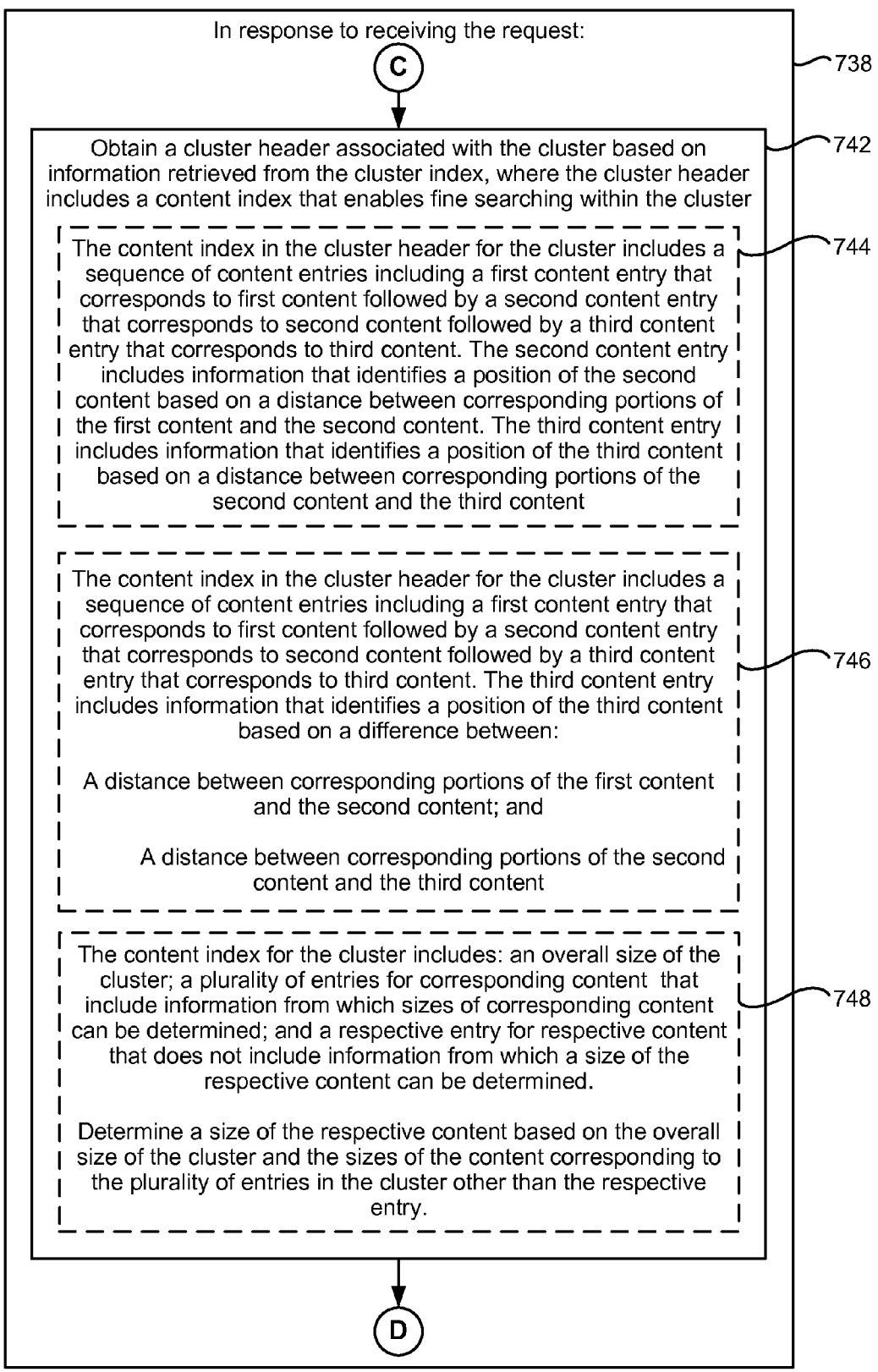
Figure 7E:
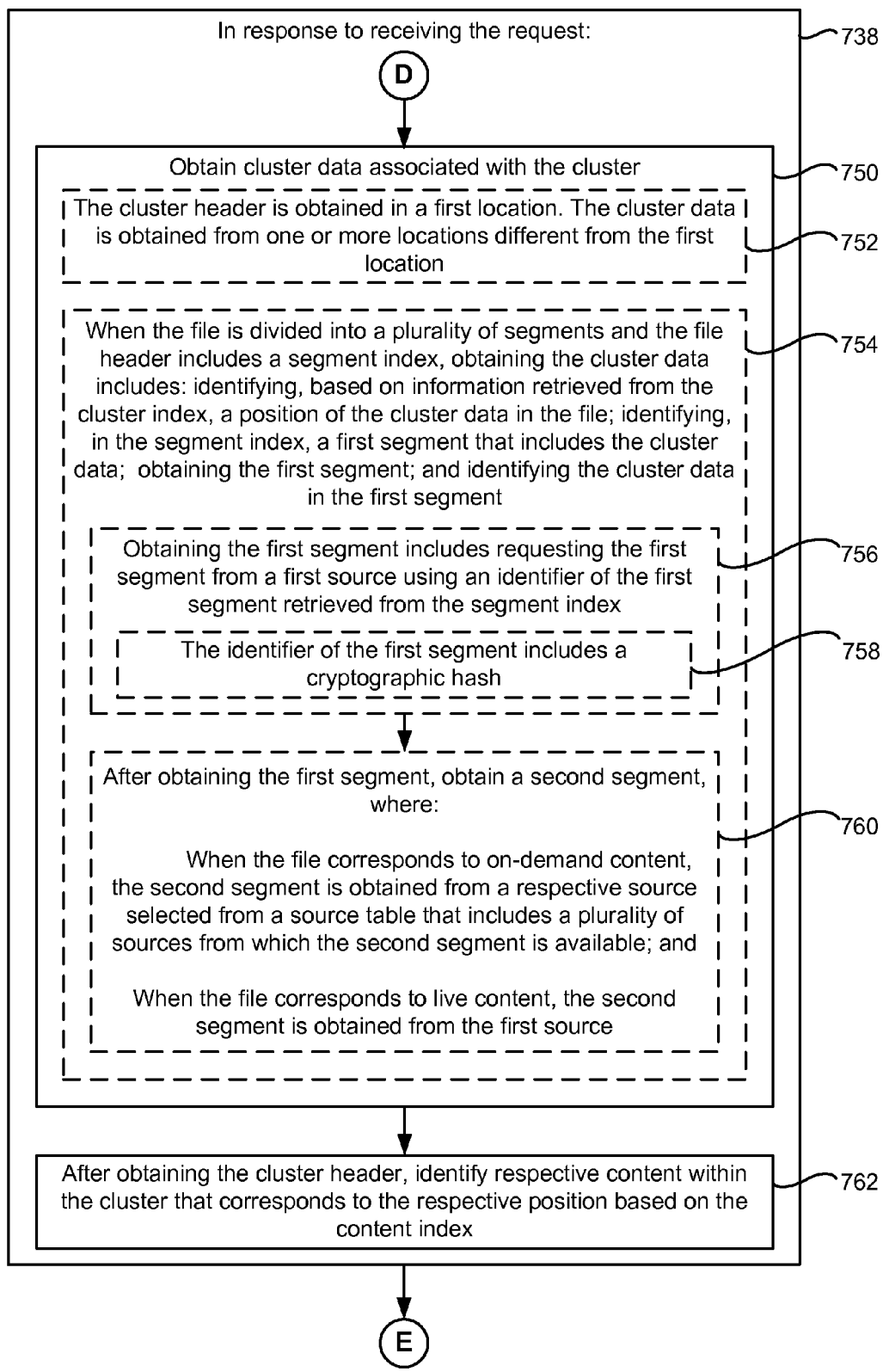
Figure 7F:
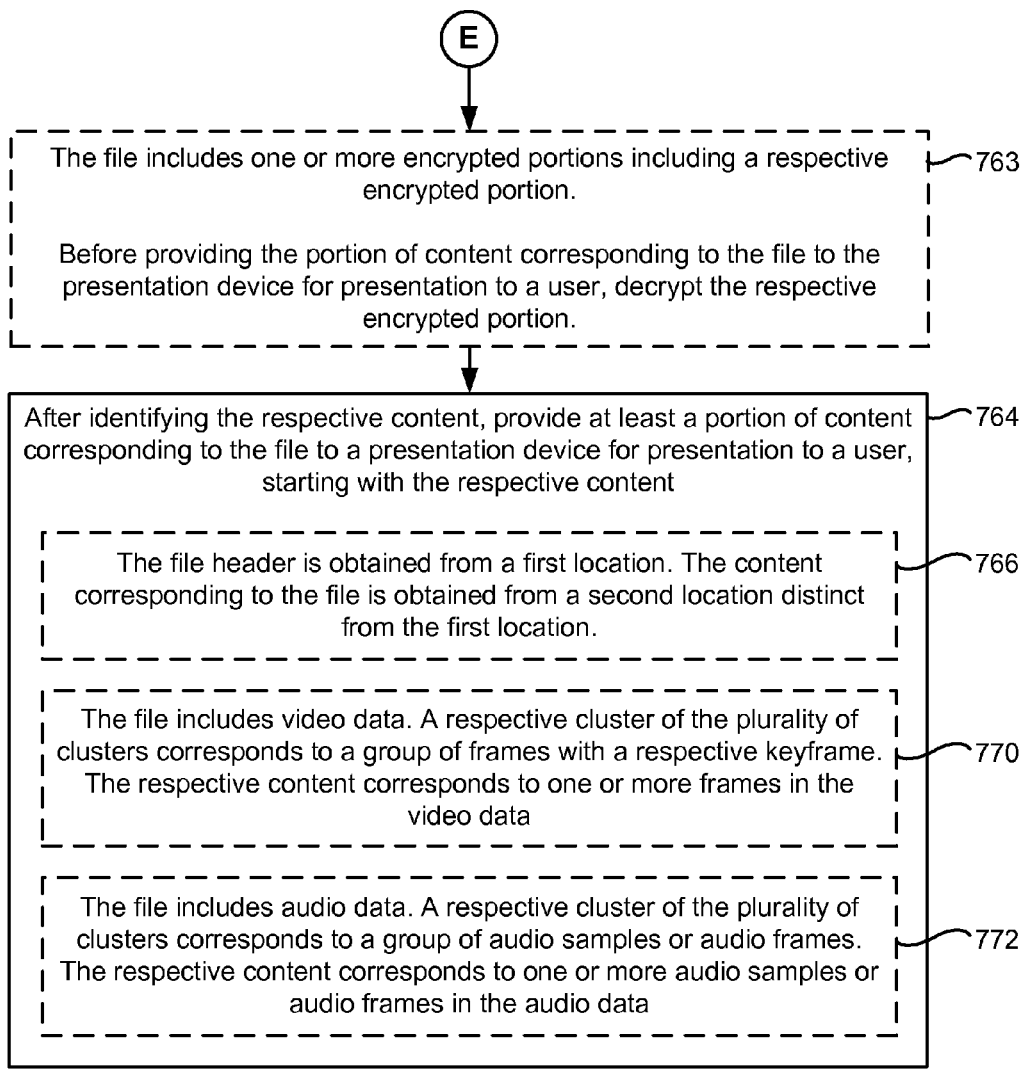
Figure 8A:
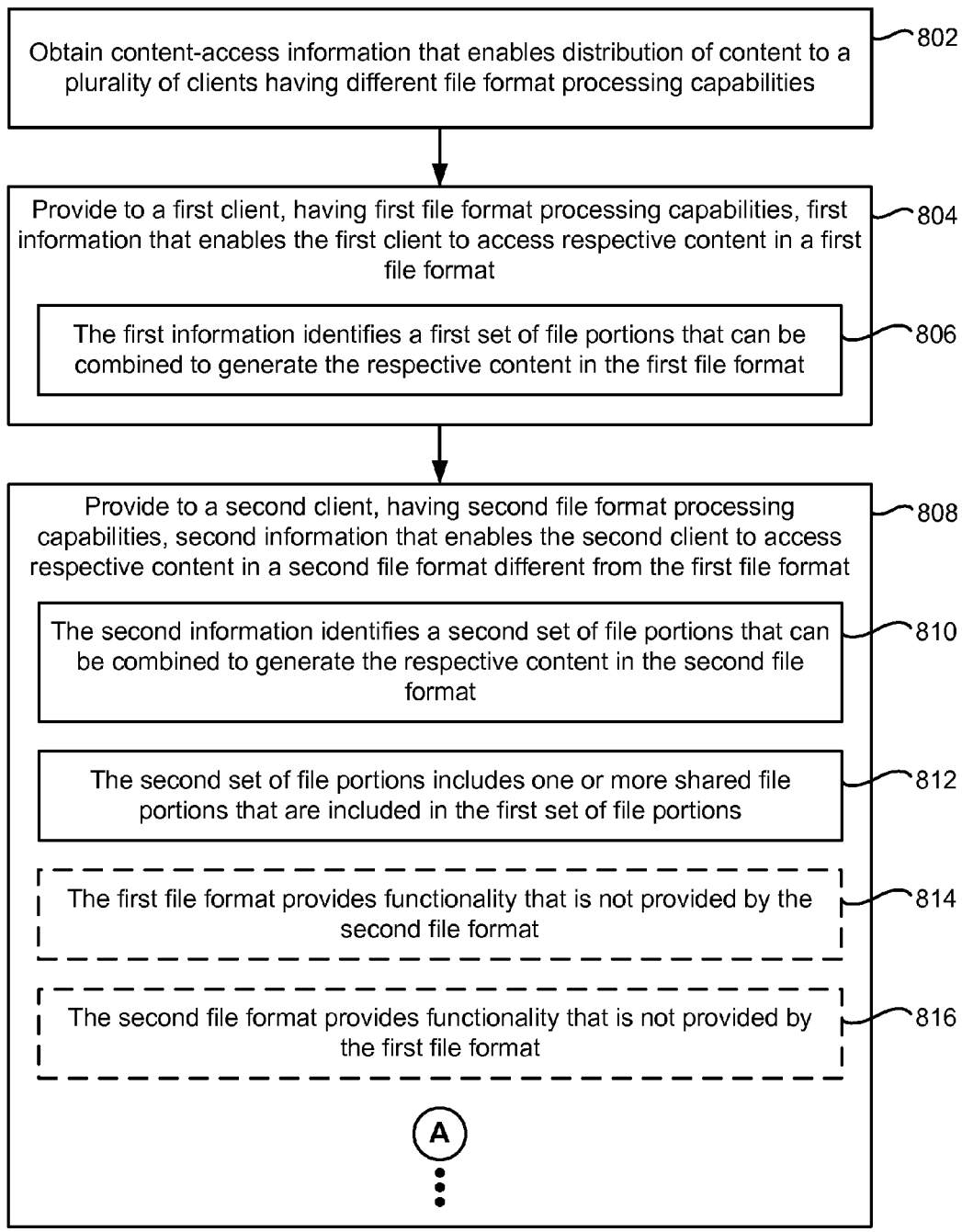
FIGS. 8A-8D are flow diagrams illustrating a method of providing media content in accordance with some implementations.
Figure 8B:
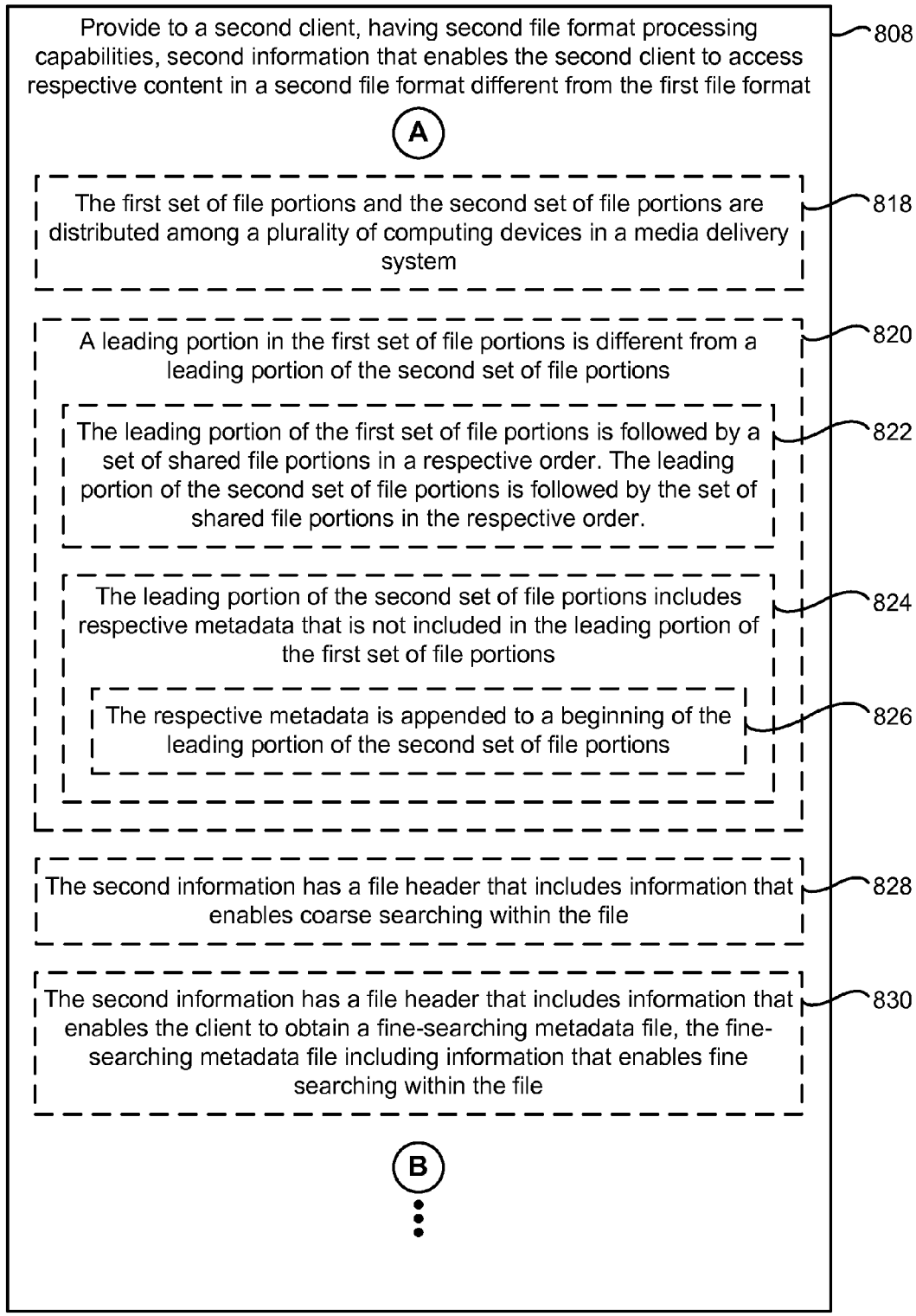
Figure 8C:
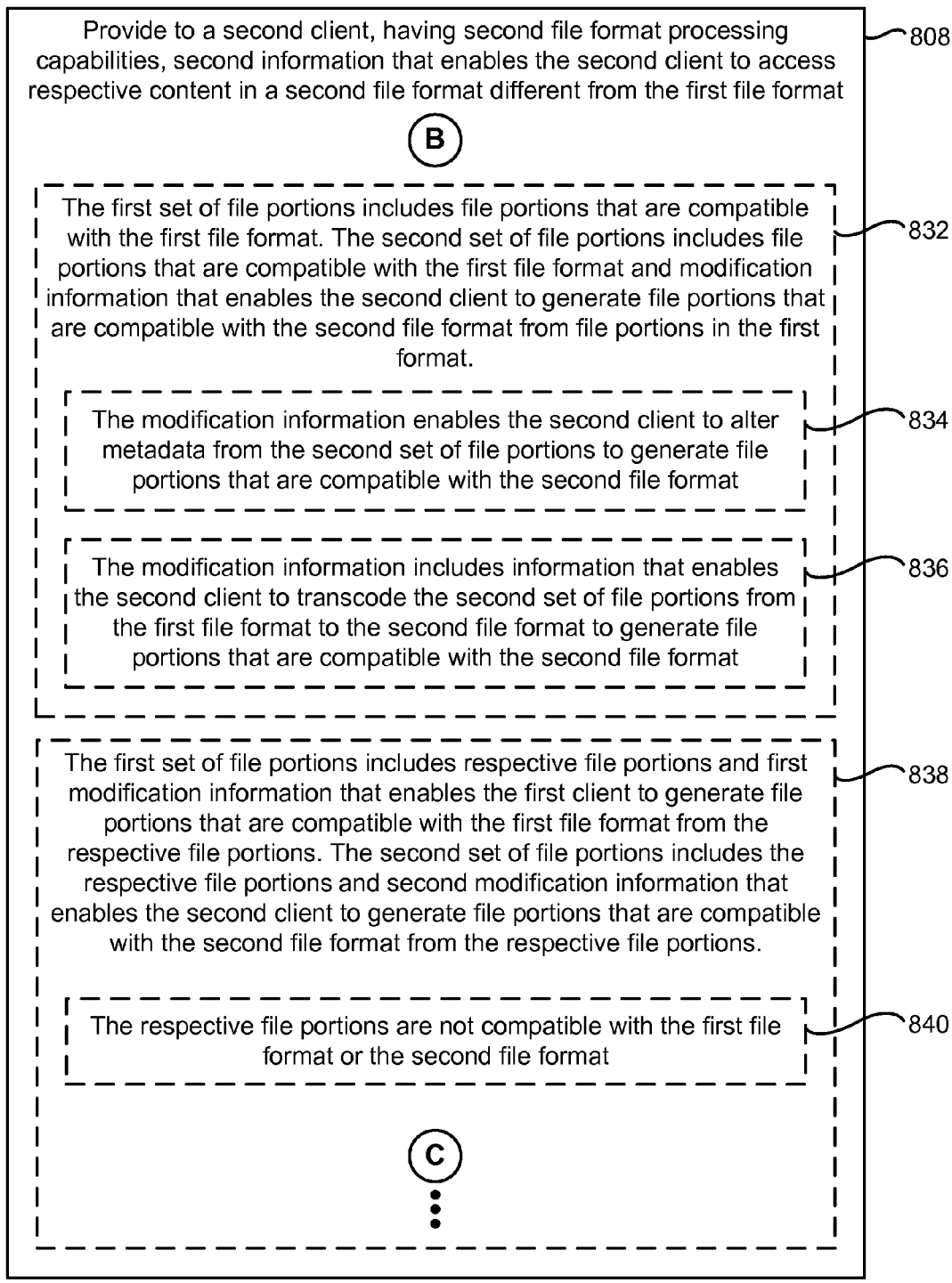
Figure 8D:
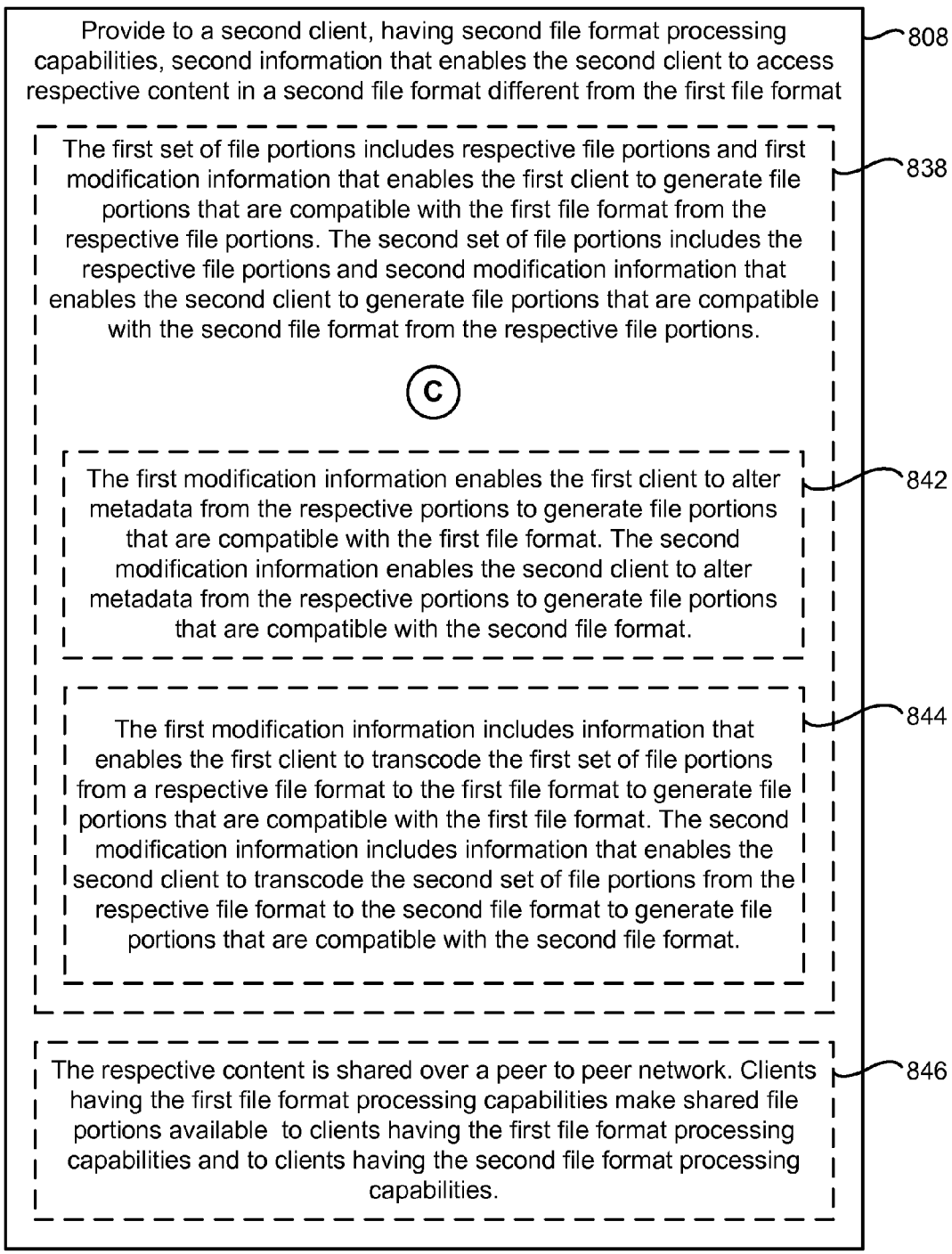

Below, FIG. 1A provides an illustration of a client-server environment 100, and FIG. 1B provides an illustration of a media delivery system 150. FIGS. 2-3 provide descriptions of a representative client device (sometimes also herein called a user device, an electronic device, a client, or, more simply a device) and a representative server system, respectively, within client-server environment 100. FIGS. 4A-4C provide illustrations of example data structures for seeking within media content. FIG. 5 provides a flowchart of a process for seeking (sometimes also herein called searching) within media content (e.g., as described in greater detail with reference to method 700 in FIGS. 7A-7F). FIGS. 6A-6C provide illustrations of example data structures for first information and second information (e.g., as described in greater detail with reference to method 800 in FIGS. 8A-8D). FIGS. 7A-7F are flow diagrams of a method of seeking or searching within media content. FIGS. 8A-8D are flow diagrams of a method of providing media content.

FIG. 1A is a block diagram of a client-server environment 100 in accordance with some implementations. Client-server environment 100 includes one or more client devices (110-1, . . . , 110-n) and one or more server systems (120-1, . . . , 120-n) that are connected through one or more networks 115. Client-server environment 100 also, optionally, includes a peer-to-peer (P2P) network 132 of clients (e.g., client applications and/or client devices) that share files with each other (e.g., via network 115), a network cache 136 (e.g., including one or more content delivery network (CDN) servers), and one or more redundant content host servers 138 (e.g., media servers) connected to one or more networks 115.

Client device 110-1 in FIG. 1A is a representative electronic device associated with a respective user. Server system 120-1 in FIG. 1A is a representative server associated with a media content provider with which users (and their electronic devices), optionally, have accounts that enable the users to access media content from one or more of server systems 120. One or more networks 115 can be any network such as the Internet, other Wide Area Networks, Local Area Networks, Personal Area Networks, metropolitan area networks, VPNs, local peer-to-peer, ad-hoc connections, and so on.

In some implementations, client device 110-1 is one of the group of: a personal computer, a mobile electronic device, a wearable computing device, a laptop, a tablet computer, a mobile phone, a digital media player, or any other electronic device able to prepare media content for presentation, control presentation of media content, and/or present media content. For example, server system 120-1 is operated and/or provided by a subscription-based media streaming service to which a user, optionally, has an account associated with account credentials that enable client device 110-1 to communicate with and receive content from content sources such as server system 120-1, P2P network 132, network cache 136 and/or redundant content host server(s) 138.

In some implementations, client device 110-1 includes a first electronic device (e.g., a controlling electronic device) and a second electronic device (e.g., a controlled electronic device), and both the first electronic device and the second electronic device are associated with a common user account (or associated user accounts) provided by a content provider with which server system 120-1 is associated. The first electronic device (e.g., a personal computer or a set top box) is optionally associated with account credentials and receives content from server system 120-1, and the second electronic device is a media presentation device (e.g., a set of speakers, a display, a television set, etc.) that receives the content from the first electronic device and presents that content to the user.

In some implementations, client device 110-1 includes a media content presentation and control application 104 (hereinafter "media application"). Media application 104 is able to control the presentation of media by client device 110-1. For example, media application 104 enables a user to navigate media content items, select media content items for playback on client device 110-1, select media streams for presentation, change currently displayed media streams, create and edit playlists, and other such operations.

In some implementations, media content is stored by client device 110-1 (e.g., in a local cache such as a media content buffer 105 and/or in permanent storage at client device 110-1). In some implementations, the media content is stored by a server system 120-1 (e.g., an origin server), which is located remotely from client device 110-1. In some implementations, the media content is stored by one or more computing devices in media delivery system 150, discussed in more detail below with reference of FIG. 1B. Media delivery system 150 includes peer-to-peer (P2P) network 132, network cache 136, and one or more redundant content host servers 138. The media content is then sent (or streamed) from one or more of the computing devices in media delivery system 150 to client device 110-1 over one or more networks 115. As used herein, media content is streamed from a source to a destination by transmitting data corresponding to the media content from the source to the destination over time where a computer at the destination can perform operations on the media content before the media content has been completely received (e.g., a first portion of the media content is received from the source and can be played before a second, later, portion of the media content is received from the source).

In some implementations, the data sent from (or streamed from) server system 120-1 is stored/cached by client device 110-1 in a local cache such as one or more media content buffers 105 in the memory of client device 110-1. Media content stored in media content buffer(s) 105 is, typically, removed after the media content is presented by client device 110-1, allowing new media content data to be stored in media content buffer 105. At least some of the media content stored in media content buffer(s) 105 is, optionally, retained for a predetermined amount of time after the content is presented by client device 110-1 and/or until other predetermined conditions are satisfied. For example the content is stored until the content has been presented by the client device, the content corresponding to a media tile is stored until the media corresponding to the media tile has reached an end of the content (e.g., an end of a movie/television show or sporting event), or the content corresponding to a first media tile is stored until the client device switches to playing content corresponding to a second media tile to enable the user to play the content corresponding to the first media tile again without re-downloading the content (e.g., in response to activation of a "play again" or "replay" affordance in a media player user interface). Media content buffer 105 is configured to store media content from more than one media content stream. Storing data in a buffer while it is being moved from one place to another (e.g., temporarily storing compressed data received from a content source before it is processed by a codec and/or temporarily storing decompressed data generated by a codec before it is rendered by a renderer) is sometimes referred to as "buffering" data, and data stored in this way is sometimes referred to a "buffered" data. "Buffered" data is typically, but optionally, removed (or marked for deletion) from the buffer in which it was stored after it is transmitted from the buffer to its destination (e.g., a codec or a renderer), rather than being stored for later use.

In some implementations, when client device 110-1 includes a first electronic device and a second electronic device, media application 104 (e.g., on a set top box) is also able to control media content presentation by the second electronic device (e.g., a set of speakers or a television set or other display connected to the set top box), which is distinct from the first electronic device. Thus, in some circumstances, the user is able to use media application 104 to cause the first electronic device to act both as a media presentation device as well as a remote control for other media presentation devices. This enables a user to control media presentation on multiple electronic devices from within media application 104 and/or using a single user interface.

When a user wants to playback media on client device 110-1, the user is enabled to interact with media application 104 to send a media control request to server system 120-1. Server system 120-1 receives the media control request over one or more networks 115. For example, the user is enabled to press a button on a touch screen of client device 110-1 in order to send the media control request to server system 120-1. As described below, a media control request is, for example, a request to begin presentation of media content by client device 110-1. Though often used herein to describe requests to initiate or begin presentation of media by client device 110-1, media control requests optionally also include requests and/or signals to control other aspects of the media that is being presented on client device 110-1, including but not limited to commands to pause, skip, fast-forward, rewind, seek, adjust volume, change the order of items in a playlist, add or remove items from a playlist, adjust audio equalizer settings, change or set user settings or preferences, provide information about the currently presented content, begin presentation of a media stream, transition from a current media stream to another media stream, and the like. In some implementations, media controls control what content is being delivered to client device 110-1 (e.g., if the user pauses playback of the content, delivery of the content to client device 110-1 is stopped). However, the delivery of content to client device 110-1 is, optionally, not directly tied to user interactions with media controls. For example, while the content that is delivered to client device 110-1 is selected based on a user request for particular content by the user, the content optionally continues to be delivered to client device 110-1 even if the user pauses playback of the content (e.g., so as to increase an amount of the content that is buffered and reduce the likelihood of playback being interrupted to download additional content). In some implementations, if user bandwidth or data usage is constrained (e.g., the user is paying for data usage by quantity or has a limited quantity of data usage available), client device 110-1 ceases to download content if the user has paused or stopped the content, so as to conserve bandwidth and/or reduce data usage.

Client-server environment 100 in FIG. 1A also includes a representative server system 120-1 that includes a media delivery module 122, a media content database 124, and a context database 126. Media content database 124 stores media content that is configured to be provided to and presented by client device 110-1 and/or provided to Network Cache 136, clients in a P2P Network 132, or other content sources. For example, media content database 124 stores audio (e.g., music, audio books, etc.), video (e.g., movies, television shows, etc.), images, or other media content that can be sent to (or streamed to) other client devices. Media content database 124 optionally includes data in different formats and file types to allow a variety of different devices and/or applications to receive content. In some implementations, the data is stored in a single file format and is converted, transcribed, transcoded, and/or transmuxed to the appropriate data type or format before or as it is streamed to client device 110-1. In some implementations, when the data is stored in a single file format, the data is converted, transcribed, transcoded, and/or transmuxed to the appropriate data type at client device 110-1. In some implementations, for a set of two or more frequently used file formats, the data is stored in multiple formats (e.g., a copy of the data for a particular file is stored in a first file format and a second file format) and the data can be transcoded or transmuxed into a different, less frequently used, file format on an as-needed basis as described in greater detail below. In some implementations, remuxing or transmuxing content includes changing a media container in which the content is organized while preserving some or all of the content within the media container.

In some implementations, server system 120-1 includes a media delivery module 122 (e.g., a media streaming module). In some implementations, media delivery module 122 receives a media control request from a respective client device (e.g., client device 110-1). In response to receiving the media control request, media delivery module 122 sends (e.g., streams) media content to a client device as requested.

In some circumstances, the received media control request includes information identifying the client device (e.g., an IP address) to which server system 120-1 should forward the media control request. For example, a user, optionally, has multiple client devices that can present media received from server system 120-1, such as a mobile phone, a computer system, a tablet computer, a television, a home stereo, etc. The identifying information optionally includes a unique or semi-unique device identifier, such as an IP address, a Media Access Control (MAC) address, a user-specified device name, an International Mobile Equipment Identity (IMEI) number, or the like. Accordingly, the media control request will identify that a request is intended for the home stereo, for example, so that server system 120-1 can send the requested media and/or the media control request to the home stereo. Client device 110-1 optionally provides server system 120-1 with an indication of device capabilities of the device such as screen resolution, processing speed, video buffer size/availability, available bandwidth, target/desired bandwidth, codec availability, and the like, and the server system provides content to the electronic device in accordance with the device capabilities.

In some implementations, server system 120-1 includes a context database 126. Context database 126 stores data associated with the presentation of media content by client device 110-1 that includes, among other things, the current position in a media content stream that is being presented by client device 110-1, a playlist associated with the media content stream, previously played content, skipped pieces of media content, and previously indicated user preferences. For example, context database 126, optionally, includes information that a content stream to client device 110-1 currently is presenting a song, at 1 minute and 23 seconds into the song, as well as all the songs played in the last hour and the next 20 songs in the playlist. In some circumstances, server system 120-1 transmits the context associated with a media content stream to client device 110-1 that is presenting the content stream so that one or more items of context information can be used by client device 110-1, such as for display to the user. When the client device to which the media content is being streamed changes (e.g., from client device 110-1 to client device 110-n), server system 120-1 transmits the context associated with the active media content to the newly active client device (e.g., client device 110-n).

FIG. 1B is a block diagram of a media delivery system 150 in accordance with some implementations. Media delivery system 150 in FIG. 1B includes a plurality of computing devices including one or more of a client device 110-1 with a local cache such as a media content buffer 105, one or more server systems 120 (sometimes also herein called origin servers) with a media delivery module 122 and a media content database 124 and/or access to a media content database 124, a peer-to-peer (P2P) network 132 including one or more peers (133-1, . . . , 133-n), a network cache 136, and one or more redundant content host servers 138. Media content is optionally stored at one or more of the computing devices in media delivery system 150. For example, media content is initially stored in media content database 124 of server system 120 and subsequently disseminated/distributed to one or more peers 133 in P2P network 132, network cache 136, and/or one or more redundant content host servers 138 for access by client device 110-1.

When client device 110-1 sends a media control request to server system 120-1 for media content, server system 120-1 (e.g., media delivery module 122) responds to the request by utilizing source information (e.g., source table 334 shown in FIG. 3) to instruct one or more of the computing devices in media delivery system 150 to send media content associated with the media control request to client device 110-1 as requested or sends relevant source information to client device 110-1 that enables client device 110-1 to request the media content associated with the media control request from a source (e.g., P2P network 132, network cache 136, and/or redundant content host servers 138). Client device 110-1 optionally obtains media content associated with the media control request from a local cache such as media content buffer 105. Client device 110-1 optionally utilizes locally stored source information (e.g., source table 242 shown in FIG. 2) to request or obtain media content associated with the media control request from one or more computing devices in media delivery system 150 (e.g., P2P network 132, network cache 136, or redundant content host servers 138). In some implementations, the locally stored source information is updated by server system 120-1 on a predefined schedule. In some implementations, the locally stored source information is updated by server system 120-1 in response to the media control request.

FIG. 2 is a block diagram illustrating a representative client device 110-1 in accordance with some implementations. Client device 110-1, typically, includes one or more processing units or cores (CPUs) 202, one or more network interfaces 210, memory 212, and one or more communication buses 214 for interconnecting these components. Client device 110-1 includes a user interface 204. User interface 204 includes one or more output devices 206, including user interface elements that enable the presentation of media content to a user, including via speakers or a visual display. User interface 204 also includes one or more input devices 208, including user interface components that facilitate user input such as a keyboard, a mouse, a voice-command input unit, a touch-sensitive display (sometimes also herein called a touch screen display), a touch-sensitive input pad, a gesture capturing camera, or other input buttons. In some implementations, client device 110-1 is a wireless device, such as a mobile phone or a tablet computer. Furthermore, in some implementations, client device 110-1 uses a microphone and voice recognition or a camera and gesture recognition to supplement or replace the keyboard. Memory 212 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 212 optionally includes one or more storage devices remotely located from one or more CPUs 202. Memory 212, or, alternatively, the non-volatile memory device(s) within memory 212, includes a non-transitory computer readable storage medium. In some implementations, memory 212, or the computer readable storage medium of memory 212, stores the following programs, modules and data structures, or a subset or superset thereof:

- an operating system 216 that includes procedures for handling various basic system services and for performing hardware dependent tasks;
- a network communication module 218 for connecting client device 110-1 to other computing devices via one or more communication network interfaces 210 (wired or wireless) connected to one or more communication networks such as the Internet, other Wide Area Networks, Local Area Networks, Personal Area Networks, metropolitan area networks, VPNs, peer-to-peer, content delivery networks, and/or ad-hoc connections;
- a presentation module 220 (e.g., a media player) for enabling presentation of media content at client device 110-1 (e.g., rendering media content) through output devices 206 associated with user interface 204 (e.g., a touch screen display, speakers, etc.);
- one or more electronic device application modules 222 for enabling client device 110-1 to perform various functionalities, one or more application modules 222 including but not limited to one or more of:
  - an input processing module 224 for receiving input from a user through input device(s) 208 and interpreting the received input;
  - a media request generation module 226 for generating a request for media content based on input received by input processing module 224;
  - a media reception module 228 for receiving media content (e.g., receiving a stream of media content) from a computing device in media delivery system 150 (e.g., for receiving media content from a computing device that is remote from client device 110-1);
  - a media application 104 for processing media content (e.g., media content streams), for providing processed media content (e.g., at least one media content stream) to presentation module 220 for transmittal to one or more output devices 206, and for providing controls enabling a user to navigate, select for playback, and control media content; the media application includes:
    - a media extraction module 230 for de-multiplexing (demuxing), decrypting, decompressing, decoding, transcoding, and/or transcode-multiplexing (transmuxing), or otherwise processing media content (e.g., a stream) received from a computing device in media delivery system 150; and
    - a seeking module 232 for utilizing and handling a respective file header for media content obtained from a computing device in media delivery system 150 so as to seek within the media content;
  - a segment request module 234 for requesting a respective segment or portion of media content from one or more computing devices in media delivery system 150;
  - one or more electronic device data modules 236 for storing data, including, but not limited to one or more of:
    - media content buffer(s) 105 (or another type of local cache) for storing (e.g., at least temporarily) media content data from a computing device in media delivery system 150 (e.g., server system 120-1 or a respective peer 133-1);
    - media content database 238 for storing, locally on client device 110-1, media content as part of the user's personal media content library;
    - a user profile database 240 for storing account information associated with a user of client device 110-1 such as user media history, user preferences, user interests, account credentials, and/or other such information; and
    - a source table 242 for storing information indicating the location or address of computing devices (e.g., sources) in the media delivery system 150 storing respective segments or portions of media content and, optionally, information indicating which computing devices store which portions of media content.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. Memory 212 optionally stores a subset or superset of the modules and data structures identified above. Memory 212 optionally stores additional modules and data structures not described above.

FIG. 3 is a block diagram illustrating a representative server system 120-1 (e.g., an origin server) in accordance with some implementations. Server system 120-1 typically includes one or more processing units CPU(s) 302, one or more network interfaces 304, memory 306, and one or more communication buses 308 for interconnecting these components. Memory 306 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 306 optionally includes one or more storage devices remotely located from CPU(s) 302. Memory 306, or, alternatively, the non-volatile memory device(s) within memory 306, includes a non-transitory computer readable storage medium. In some implementations, memory 306 or the computer readable storage medium of memory 306 stores the following programs, modules and data structures, or a subset or superset thereof:

- an operating system 310 that includes procedures for handling various basic system services and for performing hardware dependent tasks;
- a network communication module 312 that is used for connecting server system 120-1 to other computing devices via one or more communication network interfaces 304 (wired or wireless) connected to one or more networks 115 such as the Internet, other Wide Area Networks, Local Area Networks, Personal Area Networks, metropolitan area networks, VPNs, peer-to-peer networks, content delivery networks, ad-hoc connections, and so on;

one or more server application modules 314 for enabling server system 120-1 to perform various functionalities, including but not limited to one or more of:

a request processing module 316 for receiving a request from a client device (e.g., client device 110-1) for media content (e.g., a request to stream media content);

a media delivery module 122 for sending (e.g., streaming) media content to a client device (e.g., client device 110-1) remote from sever system 120-1 in response to the request from client device 110-1, media delivery module 122 including but not limited to:

an encoding module 318 for encoding media content prior to sending (e.g., streaming) the media content to client device 110-1 or to other content sources for storage;

an encryption module 320 for encrypting one or more portions of media content prior to sending (e.g., streaming) the media content to client device 110-1;

a compression module 322 for compressing media content prior to sending (e.g., streaming) the media content to client device 110-1;

an omission module 324 for omitting information from media content prior sending (e.g., streaming) the media content to client device 110-1 (e.g., by determining redundant information that can be omitted when compressing the media content while maintaining a quality of the media content above a predefined quality level); and a segmentation module 325 for dividing a media file or media content into one or more segments and distributing the one or more segments to one or more computing devices (e.g., sources) in media delivery system 150 (e.g., distributing segments of the file to different peers in a P2P network so as to enable different segments of the file to be received from different peers and used to generate the media content at a receiving client); and a context tracking module 326 for tracking and storing the context of a media content stream, optionally, including storing, among other data, one or more of the current playback position in a media content stream that is currently being presented by a client device (e.g., client device 110-1), the position in a current playlist, the play history of a user, the preferences of a user, previously skipped media content, whether media content items were "liked" or "disliked" (e.g., via "starred," "thumbs-up," and/or "thumbs-down" indications), and the like;

one or more server data modules 330 for storing data related to server system 120-1, including but not limited to:

a media content database 124 for storing media content and metadata describing the media content and enabling users to search through the media content to identify media content;

a context database 126 for storing information associated with one or more media content streams, where context information, optionally, includes one or more of the current playback position in a media content stream, metadata relating to the media, a position in a playlist, play history of a user, user preferences, skipped media, and user settings;

a user profile database 332 for storing account information for a plurality of users, where the account information for a respective user, optionally, includes a user media content request/playback history, a list of electronic devices associated with the respective user, user preferences, user interests, and other such information; and a source table 334 for storing information indicating the location or address of sources in media delivery system 150 storing respective segments or portions of media content and, optionally, information indicating which computing devices store which portions of media content.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. Memory 306 optionally stores a subset or superset of the modules and data structures identified above. Memory 306 optionally stores additional modules and data structures not described above.

Although FIG. 3 shows server system 120-1, FIG. 3 is intended more as functional description of the various features that may be present in a set of servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement server system 120-1 and how features are allocated among them will vary from one implementation to another and, optionally, depends in part on the amount of data traffic that the system must handle during peak usage periods as well as during average usage periods.

FIG. 4A is a block diagram of a data structure for an example media file 400 in accordance with some implementations. In some implementations, media file 400 includes media content such as audio (e.g., music, audio books, etc.), video (e.g., movies, television shows, etc.), images, or other media content. In some implementations, media file 400 includes a file header 402 and a plurality of clusters (e.g., cluster 1, cluster 2, . . . , cluster N). In some implementations, file header 402 includes one or more of a global header 404, a segment index 416, and a cluster index 422. In some implementations, a respective cluster (e.g., cluster N) of the plurality of clusters includes a cluster header 428 and cluster data 438. In some implementations, when media file 400 includes video content, media file 400 is divided by keyframes (e.g., frames that are self-contained and do not rely on content of other frames) and cluster data for a respective cluster includes a group of pictures (e.g., frames that are defined relative to a respective keyframe) starting with a respective keyframe. Cluster data for a respective cluster optionally includes keyframe data and one or more portions of frame data that are deltas relative to the keyframe.

In some implementations, global header 404 includes content description information or attributes corresponding to the media content in media file 400 that describe characteristics of the media file as a whole. In some embodiments, global header 404 includes content description information indicating a header version 406, a resolution 408 for the media content in media file 400, codec information 410 for decoding the media content in media file 400 (e.g., codec information 410 indicates that video content in media file 410 is formatted as H.264 and audio content in media file 400 is formatted as AAC), channel information 412 for the media content in media file 400 (e.g., a number and identify of channels of content in the media file, such as audio, video, and/or text channels), and a codec settings table 414 (e.g., with information specifying codec settings for different bitrates). For example, when media file 400 includes video content, the content description information in global header 404 includes one or more of: width and height of video frames, frame rate, and profile (e.g., an H.264 profile that specifies a type of compression to be used and provides a tradeoff between an amount of compression of the content and an amount of computational resources used to decompress the compressed content) and level (e.g., an H.264 level that constrains the bitrate and macroblocks in situation where devices have bitrate constraints). In another example, when media file 400 includes audio content, the content description information in global header 404 includes one or more of: a sample rate of the audio content, a number of channels of audio content, a number of bits per audio sample, a time scale, a time delay, a bitrate, audio codec, video codec, and a header compression indicator.

In some implementations, global header 404 also indicates a protocol used for encoding or compressing the information stored in media file 400. More specifically, global header 404 optionally indicates an offset or timestamp encoding protocol used to generate and interpret offset information 418 in segment index 416, cluster timestamp information 424 in cluster index 422, offset information 426 in cluster index 422, offset information 432 in cluster header 428, and timestamp information 434 in cluster header 428. For example, global header 404 indicates that offset information 426 in cluster index 422 is delta encoded so that offset information 426 stores a number of bytes indicating a difference between a size of a previous cluster and a size of the respective cluster. In another example, global header 404 indicates that that offset information 426 in cluster index 422 stores a size in bytes of a respective cluster.

In some implementations, media file 400 is divided into a plurality of segments where each segment includes a plurality of clusters. Typically, the first segment of the plurality of segments comprising media file 400 includes file header 402. In some implementations, each segment comprising media file 400 includes a same number of clusters. In some implementations, the segments comprising media file 400 contain a variable number of clusters. In some implementations, each segment is cluster aligned (e.g., each segment contains an integer number of clusters and the breaks between segments are selected so as to coincide with breaks between clusters). In some implementations, one or more segments are not cluster aligned (e.g., one or more segments include a non-integer number of clusters). In some implementations, the plurality of segments comprising media file 400 are stored by one or more of the computing devices in media delivery system 150. For example, a first segment is stored at peer 133-1 and peer 133-N in peer-to-peer (P2P) network 132, and a second segment is stored in network cache 136, so that a client can request the segment from different sources depending on availability of the segment at the different sources, network congestion, and other considerations. The segmentation of a respective media file is discussed in more detail below with reference to FIG. 4C.

In some implementations, segment index 416 includes a plurality of entries that correlate offset information 418 (e.g., information that can be used to determine a location of a particular segment in media file 400) with a segment identifier 420 for each segment of media file 400. For example, segment index 416 enables client device 110-1 to identify a unique segment identifier 420 for a respective segment based on offset information 418 (e.g., client device 110-1 uses segment index 416 to identify a segment identifier that corresponds to a point halfway through media file 400). In some implementations, segment identifier 420 is a unique identifier assigned to each segment. In some implementations, respective segment identifier 420 for a respective segment is (or includes) a hash (e.g., a SHA-1 hash) of content of the respective segment. In some implementations, media file 400 is segmented and file header 402 includes segment index 416 when the media content is on-demand media content. In some implementations, a segment index is not included when the media content is live content that is being provided in real time (e.g., content that is being provided to client with little or no delay from the time when the content is being recorded, such as with live news or live sports events).

In some implementations, offset information 418 is any information that enables client device 110-1 (e.g., seeking module 232) to determine or extrapolate a byte offset indicating a number of bytes from the start of media file 400 (or some other specified point within media file 400) to the start of a segment (or some other specified point within the segment) or a time offset indicating a number of time units (e.g., milliseconds, seconds, minutes, etc.) from the start of media file 400 (or some other specified point within media file 400) to the start of the segment (or some other specified point within the segment). For example, offset information 418 optionally includes a size in bytes of the segment, a length in units of time of the segment, a delta in bytes indicating the size difference between a previous segment and the respective segment, a time delta indicating the time difference between the length of the previous segment and the length of the respective segment, an offset in bytes from the start of media file 400 (or some other specified point within media file 400) to the start of the segment (or some other specified point within the segment), and/or an offset in units of time from the start of media file 400 (or some other specified point within media file 400) to the start of the segment (or some other specified point within the segment). Storing deltas between offsets and timestamps of adjacent frames and clusters can provide valuable compression of data in media file 400 that reduces bandwidth needed to transmit the media file and storage space needed to store the media file, as described in greater detail below with reference to method 700.

In some implementations, cluster index 422 includes a plurality of entries that correlate cluster timestamp information 424 with offset information 426 for each cluster in media file 400. Cluster index 422 enables coarse searching within media file 400 (e.g., keyframe- or cluster-based seeking) For example, cluster index 422 enables client device 110-1 to correlate cluster timestamp information 424 (e.g., a starting time of a respective cluster or some other specified point within the respective cluster) with offset information 426 indicating a byte offset from the start of media file 400 (or some other specified point within media file 400) to the start the respective cluster (or some other specified point within the respective cluster) so that client device 110-1 (e.g., media extraction module 230) is enabled to identify a respective cluster associated with a requested timestamp and, optionally, identify a respective segment that includes the respective cluster.

In some implementations, cluster timestamp information 424 can be any information that enables client device 110-1 (e.g., seeking module 232) to determine or extrapolate a time of the start of a respective cluster (or some other specified point within the respective cluster) relative to the start of media file 400 (or some other specified point within media file 400). For example, cluster timestamp information 424 optionally includes an absolute time of the start of a respective cluster (or some other specified point within the respective cluster) relative to the start of media file 400 (or some other specified point within media file 400), a delta in units of time between the start time of the previous cluster (or some other specified point within the previous cluster) and the start time of the respective cluster (or some other specified point within the respective cluster), and/or other delta encoding protocols (e.g., as described in greater detail below with reference to method 700).

In some implementations, offset information 426 can be any information that enables client device 110-1 (e.g., seeking module 232) to determine or extrapolate a byte offset from the start of the media file (or some other specified point within media file 400) to the start of a respective cluster (or some other specified point within the respective cluster). For example, offset information 426 optionally includes a size in bytes of the respective cluster, a delta in bytes indicating the size difference between a previous cluster and the respective cluster, and/or an offset in bytes from the start of the media file (or some other specified point within media file 400) to the start of the respective cluster (or some other specified point within the respective cluster).

For example, a user of client device 110-1 performs a seeking operation to seek to a respective timestamp within media file 400. In response to receiving the requested timestamp, client device 110-1 (e.g., seeking module 232) determines a cluster corresponding to the requested timestamp based on cluster index 422 by correlating the requested timestamp with a byte offset associated with the cluster.

In some implementations, respective cluster header 428-N (sometimes also herein called a content index) corresponding to cluster N includes a cluster size 430 for cluster N (e.g., a size in bytes) and a plurality of entries that correlate offset information 432 with timestamp information 434 for each frame in cluster N. Cluster header 428 enables fine searching within media file 400 (e.g., frame-based seeking) The first pairing 432-1, 434-1 in cluster header 428-N corresponds to a keyframe or first frame in cluster N, and the remaining pairings (e.g., 432-*n*, 434-*n*) in cluster header 428 correspond to the other frames in cluster N.

In some implementations, offset information 432 can be any information that enables client device 110-1 (e.g., seeking module 232) to determine or extrapolate a byte offset from the start of media file 400 (or some other specified point within media file 400) to the start of a frame (or some other specified point within the frame). For example, offset information 432 optionally includes a size in bytes of the frame, a number of bytes from the start of the cluster (or some other specified point within the cluster) to the start of the frame (or some other specified point within the frame), a delta in bytes indicating the size difference between the previous frame and the respective frame, and/or an offset in bytes from the start of the media file (or some other specified point within media file 400) to the start of the frame (or some other specified point within the frame). Storing deltas between offsets and timestamps of adjacent frames and clusters can provide valuable compression of data in media file 400 that reduces bandwidth needed to transmit the media file and storage space needed to store the media file, as described in greater detail below with reference to method 700.

In some implementations, timestamp information 434 can be any information that enables client device 110-1 (e.g., media extraction module 230) to determine or extrapolate a time of the start of a respective frame (or some other specified point within the respective frame) relative to the start of media file 400 (or some other specified point within media file 400). For example, timestamp information 434 optionally includes an absolute time of the start of a respective frame (or some other specified point within the respective frame) relative to the start of media file 400 (or some other specified point within media file 400), a delta in units of time between the start time of the cluster (or some other specified point within the cluster) and the start time of the respective frame (or some other specified point within the respective frame), a delta in units of time between the start time of the previous frame in the cluster (or some other specified point within the previous frame) and the start time of the respective frame (or some other specified point within the respective frame), and/or other delta encoding protocols (e.g., as described in greater detail below with reference to method 700). In some implementations, the timestamp info for the first frame in a cluster is (or corresponds to) cluster timestamp information for the cluster (e.g., the frame timestamp for the first frame in a cluster is the same as the cluster timestamp for the cluster).

In some implementations, cluster data 438-N corresponding to cluster N includes keyframe data 440-1 for the first frame (e.g., the keyframe) in cluster N and one or more portions of frame data 440-2, . . . , 440-*n* for the other frames in cluster N. In some implementations, the portions of frame data 440 are delta encoded (e.g., as described in greater detail below with reference to method 700). For example, frame data 440-2 corresponding to a second frame of cluster data 438-N optionally includes the delta or difference between keyframe data 440-1 corresponding to the prior frame in the cluster which is, in this example, the keyframe and the second frame.

FIG. 4B is a block diagram of an example data structure for a segment source table 440 (sometimes also herein called source information) in accordance with some implementations. In some implementations, an entry of segment source table 440 correlates a unique segment identifier associated with a respective segment with one or more computing devices (or sources) in media delivery system 150. In FIG. 4B, segment source table 440 indicates that source "S1" has stored segments related to segment identifiers 420-1 and 420-2. Furthermore, in FIG. 4B, segment source table 440 indicates that a respective segment related to segment identifier 420-1 is stored at a plurality of sources including S1, S5, S9, S22.

In some implementations, segment source table 440 is stored at server system 120-1 (e.g., source table 334), locally at client device 110-1 (e.g., source table 242), or at both server system 120-1 and client device 110-1. In some implementations, when client device 110-1 does not store source table 242, after client device 110-1 (e.g., seeking module 232) identifies a segment identifier 420 for a respective segment of media file 400 based on segment index 416, segment request module 234 sends a request to server system 120-1 for the respective segment. In response to receiving the request, server system 120-1 (e.g., request processing module 316) determines which computing devices in media delivery system 150 have stored the requested respective segment based on source table 334, and, in turn, instructs one or more of the computing devices in media delivery system 150 having stored the requested respective segment to deliver the requested respective segment to client device 110-1 and/or provides the source information to client device 110-1 to enable client device 110-1 to request the respective segment from the source.

In some implementations, when client device 110-1 stores source table 242, after client device 110-1 (e.g., seeking module 232) identifies a segment identifier for a respective segment of media file 400 based on segment index 416 in response to a playback or seeking request from the user of client device 110-1, segment request module 234 determines which computing devices in media delivery system 150 have stored the requested respective segment based on locally stored source table 242, and, in turn, instructs one or more of the computing devices in media delivery system 150 storing the requested respective segment to deliver the requested respective segment to client device 110-1. As shown in FIG. 4B, in some circumstances for each of a plurality of respective segments of a media file, the respective segment is stored concurrently at multiple sources (e.g., the respective segment is available from multiple peers in a P2P network and/or is available from a media server in a content delivery network).

FIG. 4C is a block diagram of an example data structure for a plurality of segments comprising media file 400 in accordance with some implementations. For example, FIG. 4C illustrates a plurality of segments 1, 2, 3 for media file 400. In FIG. 4C, segment 1 includes file header 402 and a plurality of clusters C1, C2, C3, C4, C5, C6, C7, C8. In FIG. 4C, segment 2 includes a plurality of clusters C9, C10, C11, C12, C13, C14, C15, C16, and segment 3 includes a plurality of clusters C17, C18, C19, C20, C21, C22, C23, C24. For example, in FIG. 4C, each of segments 1, 2, 3 includes an equal number of clusters. However, in some implementations, the plurality of segments comprising a media file include an unequal number of clusters. In some implementations, segmentation module 325 at server system 120-1 is configured to divide a media file into one or more segments.

FIG. 5 is a flow diagram illustrating a process 500 for seeking within media content in accordance with some implementations. For example, a user has selected media file 400 for playback via media application 104 and has received/stored file header 402 corresponding to media file 400. In some implementations, file header 402 includes cluster index 422 which enables coarse searching (e.g., keyframe-based seeking) within media file 400. In some implementations, where media file 400 is divided into a plurality of segments (e.g., for on-demand media content), file header 402 also includes segment index 422 which enables client device 110-1 to obtain segments from one or more computing devices in media delivery system 150.

At step 502, client device 110-1 (e.g., input processing module 224) receives an input from the user of client device 110-1 to seek to a respective timestamp or location within the media content via media controls (e.g., play, pause, fast-forward, rewind, seek, etc.) in media application 104 displayed on the display of client device 110-1. For example, client device 110-1 detects on a touch screen display associated with client device 110-1 a gesture in the user interface for media application 104 that corresponds to dragging a slider or time-bar (or otherwise interacts with a user interface object) to seek to a specified timestamp or a particular frame within a video file.

At step 504, client device 110-1 (e.g., seeking module 232) correlates the requested timestamp with respective cluster timestamp information 424 by determining which cluster timestamp information 424 most closely matches (or is within the range of) the requested timestamp. Seeking module 232 then utilizes cluster index 422 within file header 402 to match the respective cluster timestamp information 424 with respective offset information 426. Seeking module 232 then determines a byte offset for a respective cluster indicating a number of bytes from the start of media file 400 to the requested timestamp based on respective offset information 426. In some implementations, global header 404 within file header 402 for the media file indicates a type of offset encoding used by the media file so that seeking module 232 is enabled to determine the byte offset from respective offset information 426.

At step 506, client device 110-1 (e.g., seeking module 232) determines a segment identifier associated with a respective segment that includes the respective cluster based on the byte offset determined for the respective cluster in step 504. For example, seeking module 232 correlates the byte offset for the respective cluster with offset information 418 for the respective segment and, then, matches offset information 418 with a segment identifier 420 (e.g., segment ID 420-1) for the respective segment based on segment index 416.

At step 508, client device 110-1 (e.g., segment request module 234) determines which computing devices in media delivery system 150 have stored the respective segment based on source information (e.g., locally stored source table 242 corresponding to segment source table 440 in FIG. 4B or a remote source information such as source table 334 at server system 120-1). For example, segment request module 234 correlates the segment identifier (e.g., segment ID 420-1) determined in step 506 with one or more computing devices (e.g., sources S1, S5, S9, S22) that have stored the respective segment corresponding to the segment identifier based on segment source table 440. Segment request module 234 then sends a request, including the segment identifier (e.g., segment ID 420-1) and the address of client device 110-1, to one or more of the identified sources (e.g., source S1) to obtain the respective segment. In some implementations, if a request to one source fails (e.g., because the source fails to respond to the request or responds by indicating that the source does not have the respective segment) client device 110-1 requests the respective segment from a different source. In some implementations, if multiple requests are sent to multiple sources at the same time, client device 110-1 optionally cancels any outstanding requests once client 110-1 has received the respective segment.

At step 510, a computing device within media delivery system 150 (e.g., source S1 corresponding to one of the one or more redundant content host servers 138) receives the request from segment request module 234 with a request processor at source S1. The request processor then forwards the segment identifier and address of client device 110-1 to a response generator at source S1. At step 512, the response generator at source S1 sends the respective segment (including a plurality of clusters) associated with the segment identifier (e.g., segment ID 420-1) to the destination address specified in the request sent by segment request module 234 (e.g., the source sends the segment back to the client that requested the segment) and, optionally, sends instructions to one or more other sources indicating that the request has been fulfilled (e.g., so that the other sources can cancel processing of the request if they have not yet responded).

At step 514, client device 110-1 receives, from source S1, the respective segment corresponding to the requested timestamp. Client device 110-1 (e.g., segment request module 234) then determines a byte offset for a respective cluster within the received respective segment based on cluster index 422 (or retrieves the byte offset that was previously determined in step 504). Seeking module 232 then determines respective cluster timestamp information 424 that most closely matches (or is within the range of) the requested timestamp. Seeking module 232 then utilizes cluster index 422 within file header 402 to correlate the respective cluster timestamp information 424 with respective offset information 426. Seeking module 232 then determines a byte offset for the respective cluster indicating a number of bytes from the start of media file 400 to the start of the respective cluster (e.g., to a keyframe for the respective cluster) based on respective offset information 426.

At step 516, client device 110-1 (e.g., seeking module 232) determines offset information 432 associated with a respective frame in the respective cluster based on the byte offset determined for the respective cluster in step 514. Seeking module 232 then matches timestamp information 434 to the determined offset information 432 based on cluster header 428 and, also, determines a byte offset for the respective frame based on the determined offset information 432.

At step 518, client device 110-1 (e.g., seeking module 232) identifies based on the byte offset for the respective frame determined in step 516 frame data 440 within cluster data 438 for the respective frame that corresponds to the requested timestamp. The frame data 440 is, optionally, combined with keyframe data for a corresponding keyframe to generate a final frame that corresponds to the requested timestamp. Media application 104 then sends frame data 440 for the respective frame and the requested timestamp to presentation module 220 for presentation on client device 110-1 (e.g., on a touch screen display or other output device(s) 206). At step 520, the respective frame data is displayed (e.g., presentation module 220 at client device 110-1 receives the respective frame data and renders the respective frame data for display on a display associated with client device 110-1 or the frame data is sent to an external display to be rendered and displayed).

FIGS. 6A-6C are block diagrams illustrating example data structures that enable portions of media files to be reused between different media formats (e.g., a first media format that uses first information shown in FIG. 6A and a second media format that uses second information shown in FIGS. 6B-6C). FIG. 6A is a block diagram of an example data structure for a plurality of file portions comprising first information 600 in accordance with some implementations. First information 600 corresponds to a media file having a first file format with first file format processing capabilities. First information 600 comprises a plurality of segments including segments 1, 2, 3. In FIG. 6A, segment 1 includes a plurality of file portions P1, P2, P3, P4, P5, P6, P7, P8. In FIG. 6A, segment 2 includes a plurality of file portions P9, P10, P11, P12, P13, P14, P15, P16, and segment 3 includes a plurality of file portions P17, P18, P19, P20, P21, P22, P23, P24, P25. The file portions include the media content data (e.g., frame data for video content or sample data for audio content) for the media file. In some implementations, the file portions comprising first information 600 are a first set of file portions. In some implementations, first modification information 602 (e.g., an HTTP Live Streaming (HLS) playlist) associated with first information 600 enables a respective client device to generate file portions that are compatible with a second file format that is different from the first file format (e.g., a file format described below with reference to FIG. 6B). In some implementations, first modification information 602 is stored separately from the first set of file portions comprising first information 600.

FIG. 6B is a block diagram of an example data structure for a plurality of file portions comprising second information 650 in accordance with some implementations. Second information 650 corresponds to a media file having a second file format (different from the first file format) with second file format processing capabilities (different from the first file format processing capabilities). Second information 650 comprises a plurality of segments including segments 1, 2, 3. In FIG. 6B, segment 1 includes file header 652 and a plurality of file portions P1, P2, P3, P4, P5, P6, P7, P8. In FIG. 6B, segment 2 includes a plurality of file portions P9, P10, P11, P12, P13, P14, P15, P16, and segment 3 includes a plurality of file portions P17, P18, P19, P20, P21, P22, P23, P24, P25. The file portions include media content data (e.g., frame data for video content) for the media file, the file portions comprising second information 650 are a second set of file portions that include one or more file portions that are different from the first set of file portions. In some implementations, the file portions in first information 600 and second information 650 are the same, or at least one of the file portions are shared. For example, in FIGS. 6A and 6B, while segment 1 of first information 600 is different from segment 1 of second information 650, segments 2 and 3 of first information 600 are the same as segments 2 and 3 of second information 650. In some implementations, the file portions in the second set of file portions are synonymous with the clusters discussed above with reference to FIGS. 4A and 4C.

In some implementations, second information 650 includes file header 652 with second modification information that enables a respective client device to generate file portions that are compatible with the second file format, as described in greater detail below with reference to FIG. 6C.

FIG. 6C is a block diagram of an example data structure enabling coarse and/or fine searching within second information 650 in accordance with some implementations. In some implementations, second information 650 includes file header 652 with second modification information that enables a respective client device to generate file portions that are compatible with the second file format. In some implementations, file header 652 includes one or more global header 404, segment index 416, and cluster index 422 (e.g., for use as described in greater detail in FIGS. 4A-4C and 5). In some implementations, cluster index 422 enables coarse searching (e.g., keyframe-based seeking) within second information 650. In some implementations, when the file portions in the second set of file portions are clusters, file header 652 also includes cluster header request information 656 (e.g., a unique identifier or location information) that enables the client to obtain a metadata file 654 that includes the cluster header information that enables fine searching (e.g., frame-based seeking) within second information 650. In some implementations, metadata file 654 includes a plurality of cluster headers 428 (e.g., for use as described in greater detail in FIGS. 4A-4C and 5) for the file portions (or clusters) in second information 650. In some implementations, metadata file 654 is stored separately from the second set of file portions comprising second information 650. Storing metadata file 654 separately from the segments enables the segments to be used for both a file format that uses the cluster headers (e.g., to enable fine searching) and a different file format that does not use the cluster headers. In some implementations, when the metadata file 654 is stored separately, the cluster header information does not need to be included in the segments, and thus the segments do not have additional information that would be unnecessary and potentially render the segments unusable to a device that expects to receive segments that do not include the cluster header information.

FIGS. 7A-7F are flow diagrams illustrating a method 700 of seeking within media content in accordance with some implementations. In some implementations, method 700 is performed at an electronic device (e.g., client device 110-1, FIGS. 1A and 2) with one or more processors, memory, and a display. In some implementations, the display is a touch screen display and the touch-sensitive surface is on the display. In some implementations, the display is separate from the touch-sensitive surface. Some operations in method 700 are, optionally, combined and/or the order of some operations is, optionally, changed.

The electronic device obtains (702) a file header for a file that corresponds to a plurality of clusters, where the file header includes a cluster index that enables coarse searching within the file (e.g., keyframe-based searching or seeking) In some implementations, the file header (e.g., file header 402, FIG. 4A) is received along with a first cluster of the file (e.g., the file header is received as part of a file segment that includes both the first cluster and the file header). In some implementations, the file header is received before receiving a first cluster of the file.

In some implementations, the electronic device obtains (704) the file header in response to a request for content associated with the file (e.g., a request to begin playing content associated with the file). For example, in response to a request from the user of client device 110-1 to playback media content via media controls in media application 104 displayed on the display of client device 110-1, client device 110-1 obtains a file header (e.g., file header 402, FIG. 4A) associated with the media content. In some implementations, client device 110-1 obtains the file header from server system 120-1 or from a local cache.

In some implementations, the cluster index does not include (706) information that enables fine searching within the file. For example, the cluster index (e.g., cluster index 422, FIG. 4A) only enables coarse searching (e.g., cluster-based or keyframe-based seeking) within the media content, and the cluster header (e.g., cluster header 428-N, FIG. 4A) enables fine searching (e.g., frame-based seeking) within the media content.

In some implementations, the file header and/or the file omit (708) respective omitted information that is necessary for extracting content (e.g., decoding) from the file. In some implementations, if client device 110-1 obtaining the file and server system 120-1 transmitting/generating the file knows that a particular codec or file format will always be used (e.g., based on a standardized codec that is used by the server system and the client device or based on an out of band communication between the server system and the client device agreeing to use a particular codec), then server system 120-1 transmitting/generating the file, optionally, omits codec or file format information from global header 404 of the file, and client device 110-1 obtaining the file can assume that the codec or file format has been used without reading the information from global header 404 in file header 402. Similarly, information that can be calculated from information included in the file is, optionally, omitted from the file. For example, if a total size of the file, or a portion thereof, is needed but can be calculated by adding together sizes of a plurality of components of the file, or the portion thereof, then the total size of the file, or the portion thereof, is omitted. For example, omission module 324 at server system 120-1 is configured to omit information from the file header as described above so as to reduce the size of the file.

In some implementations, the respective omitted information is removed (710) from the file header and/or the file before the file header is obtained by the electronic device (e.g., the respective omitted information was removed prior to storage and/or transmission of the file from server system 120-1 to client device 110-1); and prior to providing the portion of content corresponding to the file to the presentation device (e.g., a display or touch screen display) for presentation to the user, the electronic device: generates (e.g., re-determines) the respective information (e.g., calculating a size of content) based on the file header and/or the file and adds the omitted information into the file header and/or file. Sometimes, this means that client device 110-1 (e.g., media extraction module 230) replaces data that was removed from an externally defined data structure by server system 120-1. For instance, the first few bytes of a properly formatted H.264 file indicate the length of what follows. In some implementations, the file container measures the whole size of everything, so, server system 120-1 can remove the redundant bytes from the H.264 file header for file storage and transmission, and media extraction module 230 at client device 110-1 can replace them before handing the H.264 file header to presentation module 220 or player software that expects the valid format. For example, omission module 324 at server system 120-1 is configured to omit information from the file header and/or the file as described above.

In some implementations, the respective omitted information is removed (712) from the file header and/or the file in accordance with a determination that the respective omitted information is duplicative of information that is included elsewhere in the file header and/or the file. For example, if server system 120-1 determines that a piece of data is in the file twice or more, server system 120-1 removes the redundant instances to have the piece of data appear only once in the file and/or file header. For example, omission module 324 at server system 120-1 is configured to omit information from the file header and/or the file as described above.

In some implementations, the respective omitted information is removed (714) from the file header and/or the file in accordance with a determination that the respective omitted information describes aspects of the content corresponding to the file that are already known to the electronic device (e.g., even if the respective omitted information is not duplicative of information that is included elsewhere in the file header and/or the file). For example, if a property of media content is defined out of band (e.g., the property is defined via communications that occur outside of the transmission of the portions of the media file to client device 110-1), then the individual media files do not need to specify that property for the corresponding media content separately. In this example, server system 120-1 can omit the information that the media uses the H.264 codec from the file header and file because client device 110-1 knows that any media content received from a computing device in media delivery system 150 employs the H.264 codec. For example, omission module 324 at server system 120-1 is configured to omit information from the file header and/or as described above.

In some implementations, the file header is compressed and prior to using the cluster index (e.g., prior to identifying the cluster of the plurality of clusters that includes content that corresponds to the respective position based on the cluster), the electronic device decompresses (716) the file header and identifies the cluster index in the decompressed file header. In some implementations, lossless compression is used (e.g., gzip). For example, compression module 322 at server system 120-1 is configured to compress the file header according to a predefined protocol. And, for example, media application 104 (e.g., media extraction module 230) is configured to decompress the file header according to the predefined protocol.

In some implementations, the plurality of clusters have (718) a predefined size. For example, for live content, clusters have a predetermined size or length (e.g., four seconds long). In some implementations, a first cluster of the plurality of clusters has (720) a first size and a second cluster of the plurality of clusters has a second size different from the first size. For example, for on-demand content, cluster length ranges between one and four seconds long (e.g., depending on the length of size of a group of pictures or a scene). For example, a first cluster in a segment is two seconds long and a second cluster in the segment is three seconds long.

In some implementations, a size of the cluster index increases (722) over time. For live content, entries are added to the cluster index as time advances. For on-demand content, the cluster index is fixed after cluster data is generated. Thus, in some implementations, when client device 110-1 initially requests the file that corresponds to live content, the cluster index has a first size and after a period of time (e.g., 10 minutes, while content corresponding to the file is being presented to a user) client device 110-1 obtains an updated file header that includes a cluster index with a second size that is larger than the first size.

In some implementations, the file header includes (724) a respective number that is stored as a non-floating point number, and the respective number is converted from a floating point number to the non-floating point number based on a determination that a non-floating point representation of the respective number is below a predefined size (e.g., below a minimum size of a floating point number). Thus, in some implementations, a floating point representation of a numbers is replaced with an integer representation of the number where the integer representation of a number takes less space to store (and less bandwidth to transmit) than a floating point representation of the number. For example, a number that is between 0 and 10 and is measured in tenths of an integer takes fewer bits to store than a corresponding floating point number with seven digit accuracy.

In some implementations, the file header further includes (726) a global header that provides content description information that enables the device to prepare content of the file for presentation to the user. In some implementations, when the file includes video content, the content description information includes one or more of: width and height of video frames, frame rate, and profile and level for a video codec such as H.264. In some implementations, when the file includes audio content, the content description information includes one or more of: sample rate of the audio content, number of channels of audio content, bits per audio sample, time scale, time delay, bitrate, and header compression.

In some implementations, the file is divided (728) into a plurality of segments, a respective segment of the plurality of segments includes multiple sequential clusters from the plurality of clusters, and the file header further includes a segment index that enables the device to identify a respective segment that includes requested content. For example, in FIG. 4A, file header 402 includes segment index 416 that enables client device 110-1 to identify which segment of the plurality of segments includes an identified cluster. FIG. 4C, for example, shows a plurality of segments 1, 2, 3 comprising media file 400 shown in FIG. 4A. In FIG. 4C, segment 1 includes file header 402 and a plurality of clusters C1, C2, C3, C4, C5, C6, C7, C8, segment 2 includes a plurality of clusters C9, C10, C11, C12, C13, C14, C15, C16, and segment 3 includes a plurality of clusters C17, C18, C19, C20, C21, C22, C23, C24. For example, segmentation module 325 at server system 120-1 is configured to divide a media file into one or more segments (e.g., so that the media file can be distributed to and obtained from a number of different content sources).

In some implementations, the plurality of segments of the file are distributed (730) among a plurality of sources; and the first segment is available from a plurality of different sources (e.g., one or more central content-distribution servers, one or more peers in peer-to-peer network, a local cache, a content delivery network, a local area network cache, etc.). FIG. 1B, for example, shows media delivery system 150 with a plurality of computing devices or sources. In some implementations, a first source of the first segment is identified using source information (e.g., segment source table 440) that includes one or more sources for segments of the file. FIG. 4B, for example, shows segment source table 440 where each entry includes a plurality of sources in media delivery system 150 associated with segment identifier 420 for a respective segment. In some implementations, segment source table 440 (e.g., source table 242) is stored locally at client device 110-1. In some implementations, segment source table 440 (e.g., source table 334) or information from segment source table 440 is retrieved from a content delivery coordination server or origin server (e.g., server system 120-1). For example, segmentation module 325 at server system 120-1 is configured to distribute the one or more segments to one or more computing devices (e.g., sources) in media delivery system 150.

In some implementations, the plurality of segments for the file include (732) one or more cluster-aligned segments that each include an integer number of clusters greater than or equal to one. In some implementations, all of the segments for the file are cluster-aligned. In some implementations, some of the segments for the file are cluster-aligned while other segments are not cluster-aligned. In some implementations, segments are determined without regard to whether or not the segments are cluster-aligned.

In some situations, it is desirable to maintain roughly the same size of segment for segments that are provided to clients, so that the system can deliver the segments predictably and efficiently (e.g., segment storage and delivery can be optimized for segments within a predefined range of sizes rather than being adapted to handle segments of an arbitrary size). In some implementations, segment size is controlled at least in part by adjusting a number of clusters that are included in a segment so as to maintain a roughly uniform segment size (e.g., a segment size within the predefined range of sizes). In some implementations, a first segment of the plurality of segments includes (734) a first set of N clusters and a second segment of the plurality of segments includes a second set of M clusters, where the clusters in the first set of N clusters are distinct from the clusters in the second set of M clusters. In some implementations, M=N (e.g., for live content, clusters have a fixed size and thus segments with the same number of clusters will have approximately the same size). In some implementations, M≠N (e.g., for on-demand content, clusters, optionally, have varying sizes and thus segments optionally have different numbers of clusters in situations where doing so helps to maintain segments of approximately the same size). However, in some implementations, no two segments (in either live or on-demand) have a cluster in common (e.g., segments do not overlap with each other).

The electronic device receives (736) a request to seek to a respective position (e.g., a timestamp or a particular frame) within the file. For example, client device 110-1 (e.g., input processing module 224) detects on a touch screen display associated with client device 110-1 a gesture in the user interface for media application 104 that corresponds to the user dragging a slider or time-bar (or otherwise interacts with a user interface object) to seek to a specified timestamp or a particular frame within a video file.

In response to receiving the request (738), the electronic device identifies (740) a cluster of the plurality of clusters that includes content that corresponds to the respective position based on the cluster index (e.g., the cluster index includes timestamp information and offset information for each cluster). FIG. 4A, for example, shows cluster index 422 with an entry for each cluster in media file 400, where each entry includes cluster timestamp information 424 and offset information 426. In some implementations, the cluster corresponding to the respective position is identified by utilizing cluster index 422 to correlate the timestamp requested by the user to a byte offset corresponding to (e.g., recorded in or calculated from) the offset information, which identifies a particular cluster.

In response to receiving the request (738), the electronic device obtains (742) a cluster header associated with the cluster based on information retrieved from the cluster index, where the cluster header includes a content index that enables fine searching within the cluster. FIG. 4A, for example, shows cluster header 428-N with cluster size 430 for cluster N and an entry for each frame in cluster N, where each entry includes offset information 432 and timestamp information 434.

In some implementations, the content index in the cluster header for the cluster includes (744) a sequence of content entries including a first content entry that corresponds to first content followed by a second content entry that corresponds to second content followed by a third content entry that corresponds to third content. In some implementations, the second content entry includes information that identifies a position of the second content (e.g., a position of the second content within the cluster for offset information or a position of the second content within the media content that corresponds to the file for timestamp information) based on a distance between corresponding portions of the first content and the second content (e.g., a distance between a beginning of the first content and a beginning of the second content within the cluster for offset information or a distance between times associated with the first content and the second content for timestamp information). In some implementations, the third content entry includes information that identifies a position of the third content (e.g., a position of the third content within the cluster for offset information or a position of the third content within media that corresponds to the file for timestamp information) based on a distance between corresponding portions of the second content and the third content (e.g., a distance between a beginning of the second content and a beginning of the third content within the cluster for offset information or a distance between times associated with the second content and the third content within media that corresponds to the file for timestamp information).

In one example, the sequence {0, 100, 205, 295, 400}, where each number in the sequence corresponds to a byte offset from the start of a respective cluster to the start of a respective frame in the respective cluster, is stored as the sequence {0, 100, 105, 90, 105}. In this example, each number in the stored sequence is the difference between the byte offset for the respective frame and the byte offset for the previous frame. For example, a first entry in the stored sequence is zero, the second entry is equal to 100-0, the third entry is equal to 205-100, the fourth entry is equal to 295-205, and the fifth entry is equal to 400-295. In some implementations, timestamp information (e.g., measured in frames or milliseconds) and/or offset information (e.g., measured in bytes) is compressed (e.g., stored as deltas of positions) as described above. For example, cluster timestamp information 424 in cluster index 422 or timestamp information 434 in cluster header 428 is compressed as described above. In another example, offset information 418 in segment index 416, offset information 426 in cluster index 422, or offset information 432 in cluster header 428 is compressed as described above. In some implementations, information that identifies the position of respective content within the cluster (e.g., offset information that identifies a position in bytes of the respective content within the cluster) is compressed (e.g., stored as deltas of positions) as described above. In some implementations, information that identifies the position of the respective content within media content that corresponds to the file (e.g., timestamp information that identifies a temporal position of the respective content in media that corresponds to the file) is compressed (e.g., stored as deltas of positions) as described above. For example, compression module 322 at server system 120-1 is configured to compress the media file according to the protocol described above, and media extraction module 230 at client device 110-1 is configured to decompress the media file according to the protocol.

In some implementations, the content index in the cluster header for the cluster includes (746) a sequence of content entries including a first content entry that corresponds to first content followed by a second content entry that corresponds to second content followed by a third content entry that corresponds to third content. In some implementations, the third content entry includes information that identifies a position of the third content (e.g., a position of the third content within the cluster for offset information or a position of the third content within media that corresponds to the file for timestamp information) based on a difference between: a distance between corresponding portions of the first content and the second content (e.g., a distance between a beginning of the first content and a beginning of the second content within the cluster for offset information or a distance between times associated with the first content and the second content within media that corresponds to the file for timestamp information) and distance between corresponding portions of the second content and the third content (e.g., a distance between a beginning of the second content and a beginning of the third content within the cluster for offset information or a distance between times associated with the second content and the third content within media that corresponds to the file for timestamp information).

In one example, the sequence {0, 100, 205, 295, 400}, where each number in the sequence corresponds to a byte offset from the start of a respective cluster to the start of a respective frame in the respective cluster, is stored as {0, 100, 5, −20, 15}. In this example, first, the difference between the byte offset for the respective frame and the byte offset for the previous frame is calculated (e.g., the calculated sequence is {0, 100, 105, 90, 105}), and, then, each number in the stored sequence is the difference between the difference calculated for the respective frame and the difference calculated for the previous frame. For example, the first entry in the stored sequence is 0, the second entry is equal to 100-0, the third entry is equal to 105-100, the fourth entry is equal to 90-105, and the fifth entry is equal to 105-90. In some implementations, timestamp information (e.g., measured in frames or milliseconds) and/or offset information (e.g., measured in bytes) is compressed (e.g., stored as deltas of distances) as described above. Almost any kind of information can be compressed as described above. For example, cluster timestamp information 424 in cluster index 422 or timestamp information 434 in cluster header 428 can be compressed as described above. For example, offset information 418 in segment index 416, offset information 426 in cluster index 422, or offset information 432 in cluster header 428 is optionally compressed as described above. In some implementations, information that identifies the position of respective content within the cluster (e.g., offset information that identifies a position in bytes of the respective content within the cluster) is compressed (e.g., stored as deltas of distances) as described above. In some implementations, information that identifies the position of the respective content within media content that corresponds to the file (e.g., timestamp information that identifies a temporal position of the respective content in media that corresponds to the file) is compressed (e.g., stored as deltas of distances) as described above. In some implementations, other position information is compressed (e.g., stored as deltas of distances) as described above. For example, compression module 322 at server system 120-1 is optionally configured to compress the media file according to the protocol described above, and media extraction module 230 at client device 110-1 is optionally configured to decompress the media file according to the protocol.

In some implementations, the content index for the cluster includes (748) an overall size of the cluster, a plurality of entries for corresponding content (e.g., corresponding frames) that include information from which sizes of corresponding content can be determined, and a respective entry for respective content that does not include information from which a size of the respective content can be determined. In some implementations, client device 110-1 determines a size of the respective content based on the overall size of the cluster and the sizes of the content corresponding to the plurality of entries in the cluster other than the respective entry. In some implementations, when a respective chunk (e.g., an outer container) comprises a plurality of portions (e.g., inner containers), information in a respective portion does not repeat the size of the previous portion. For example, the size of a last portion can be determined by subtracting the sizes of all other portions in the respective chunk from the size of the respective chunk. For example, compression module 322 at server system 120-1 is configured to compress the media file as described above and media extraction module 230 at client device 110-1 is configured to decompress the media file by reversing the process described above.

In response to receiving the request (738), the electronic device obtains (750) cluster data associated with the cluster. For example, step 514 in FIG. 5 shows client device 110-1 determining a byte offset for a respective cluster corresponding to a requested timestamp based on cluster index 516. Upon determining the byte offset for the respective cluster, client device 110-1 is enabled to obtain the respective cluster, including both a cluster header and cluster data, based on the determined byte offset.

In some implementations, the cluster header is obtained (752) in a first location and the cluster data is obtained from one or more locations different from the first location. In some implementations, the cluster data is stored/received together with the cluster header. For example, both cluster header 428-N and cluster data 438-N corresponding to cluster N are stored at an origin server (e.g., server system 120-1). In some implementations, the cluster data is stored/received separately from the cluster header. For example, cluster header 428-N corresponding to cluster N is stored at an origin server (e.g., server system 120-1) and cluster data 438-N corresponding to cluster N is stored at a peer 133 in P2P network 132.

In some implementations, obtaining the cluster data includes (754) identifying, based on information retrieved from the cluster index (e.g., offset information), a position of the cluster data in the file (e.g., a byte offset), identifying, in the segment index (e.g., based on the byte offset), a first segment that includes the cluster data, obtaining the first segment, and identifying the cluster data in the first segment. For example, step 506 in FIG. 5 shows client device 110-1 identifying a segment identifier for a first segment including the cluster data corresponding on the byte offset determined in step 504 based on segment index 416. For example, step 508 in FIG. 5 shows client device 110-1 determining a source for the first segment based on source information (e.g., source table 242 or source table 334) and sending a request for the first segment including the segment identifier for the first segment and the address of the device to one or more sources associated with the segment identifier for the first segment. For example, step 514 in FIG. 5 shows client device 110-1 receiving the first segment from one of the one or more sources associated with the segment identifier for the first segment. For example, step 518 in FIG. 5 shows client device 110-1 identifying cluster data in the first segment corresponding to a requested frame based on a byte offset determined in step 516.

In some implementations, obtaining the first segment includes (756) requesting the first segment from a first source using an identifier of the first segment retrieved from the segment index. In some implementations, segment index 416 includes offset information and a segment identifier (e.g., a SHA-1 hash) for each segment comprising the media file. For example, segment index 416 in FIG. 4A includes a plurality of entries for each segment comprising media file 400, where an entry for a respective segment includes offset information 418 and segment identifier 420. First, cluster index 422 relates a user requested timestamp (e.g., by way of cluster timestamp information 424) to a byte offset (e.g., by way of offset information 426). Then, the byte offset is used to determine a corresponding segment identifier 420 in segment index 416. In some implementations, the identifier of the first segment includes (758) a cryptographic hash. For example, segment identifiers 420 in segment index 416 generated by applying a cryptographic hash function (e.g., MD5, SHA-0, SHA-1, SHA-3, etc.) to content of the corresponding segment.

In some implementations, after obtaining the first segment, the electronic device obtains (760) a second segment, where: when the file corresponds to on-demand content, the second segment is obtained from a respective source selected from a source table that includes a plurality of sources from which the second segment is available and when the file corresponds to live content, the second segment is obtained from the first source. For example, in some situations, for on-demand content, segments for a media file are stored in and obtained from one or more different sources in media delivery system 150. In some implementations, one or more sources for a respective segment are determined from source information (e.g., source table 242 stored locally at the device or source table 334 stored remotely from the device at server system 120-1). For example, in some situations, for live content (e.g., real-time content), segments for a media file are stored at (or streamed from) a single source in media delivery system 150 and the segments are obtained by transmitting requests to a same source such as a same uniform resource locator (URL). In this example, the computing device that receives the requests, optionally, balances the load by instructing different sources to transmit the segments to the device when its resources or bandwidth does not meet certain predefined criteria.

After obtaining the cluster header, the electronic device identifies (762) respective content (e.g., a frame) within the cluster that corresponds to the respective position based on the content index. In some implementations, the frame is identified by correlating the timestamp requested by the user to a byte offset in the offset info that identifies a frame within the cluster. For example, step 518 in FIG. 5 shows client device 110-1 identifying frame data for a respective frame based on the byte offset for the respective frame determined in step 516.

After identifying the respective content, the electronic device provides (764) at least a portion of content corresponding to the file to a presentation device for presentation to a user, starting with the respective content. For example, step 518 in FIG. 5 further shows client device 110-1 sending the identified frame data to a presentation device (e.g., software configured render frame data on a display) identifying frame data for a respective frame based on a byte offset for the respective frame determined in step 516.

In some implementations, the file header is obtained (766) from a first location and the content corresponding to the file is obtained from a second location distinct from the first location. In some implementations, file header 402 for media file 400 is obtained from a first source (e.g., an origin server or server system 120-1) in media delivery system 150 and content comprising media file 400 (e.g., segments or cluster data) is obtained from one or more sources (e.g., peers 133 in P2P system 132 and/or network cache 136) in media delivery system 150 different from the first source.

In some implementations, the file includes (763) one or more encrypted portions including a respective encrypted portion and, before providing the portion of content corresponding to the file to the presentation device for presentation to a user, the device decrypts the respective encrypted portion. In some implementations, at least a portion of the file header is encrypted. In some implementations, at least a portion of a cluster header is encrypted. In some implementations, at least a portion of the cluster data is encrypted. For example, encryption module 320 at server system 120-1 is configured to encrypt one or more portions of the media file according to a predefined encryption algorithm, and media extraction module 230 at client device 110-1 is configured to decrypt the one or more portions of the media file according to the predefined encryption algorithm.

In some implementations, the file includes (770) video data; a respective cluster of the plurality of clusters corresponds to a group of frames with a respective keyframe and the respective content corresponds to one or more frames in the video data. In some implementations, the file includes (772) audio data; a respective cluster of the plurality of clusters corresponds to a group of audio samples or audio frames and the respective content corresponds to one or more audio samples or audio frames in the audio data.

It should be understood that the particular order in which the operations in 7A-7F have been described is merely exemplary, and is not intended to indicate that the described order is the only order in which the operations could be performed. One of ordinary skill in the art would recognize various ways to reorder the operations described herein. It should be noted that details of other processes described herein with respect to other methods described herein (e.g., method 800) are also applicable in an analogous manner to method 700 described above with respect to FIGS. 7A-7F. Additionally, it should be noted that details of other processes described herein with respect to other methods described herein (e.g., method 800) are also applicable in an analogous manner to method 700 described above with respect to FIGS. 7A-7F. For example, the requests, media files, and file headers described above with reference to method 700, optionally, have one or more of the characteristics of the requests, media files, and file headers described herein with reference to other methods described herein (e.g., method 800). For brevity, these details are not repeated here.

FIGS. 8A-8D are flow diagrams illustrating a method 800 of providing media content in accordance with some implementations. In some implementations, method 800 is performed at a computer system (e.g., server system 120-1, FIGS. 1A and 3) with one or more processors and memory. Some operations in method 800 are, optionally, combined and/or the order of some operations is, optionally, changed.

The computer system obtains (802) content-access information (e.g., server 120 generates source table 334, updates source table 334 and/or retrieves content-access information from source table 334) that enables distribution of content to a plurality of clients having different file format processing capabilities. In some implementations, the content-access information includes locations of content in a content distribution network, a list of peers that have portions of the content, other information that can be used by the computer system to provide the content to a respective client and/or other information that can be used by a respective client to request the content from a content source (e.g., a media server or a peer). For example, server system 120-1 determines the addresses (e.g., IP or MAC addresses) of a plurality of client devices (e.g., including first client device 110-1 having first file format processing capabilities and second client device 110-n having second format processing capabilities) in media delivery system 150 so as to enable server system 120-1 to provide file portions to the client devices having different format processing capabilities.

The computer system provides (804) to a first client (e.g., client device 110-1), having first file format processing capabilities, first information that enables the first client to access respective content in a first file format (e.g., HLS format). For example, the computer system provides the first client with a first portion of the previously obtained content-access information (e.g., from source table 334) that includes locations from which the respective content in the first file format can be retrieved and/or provides the first client with the respective content in the first file format.

The first information identifies (806) a first set of file portions (e.g., the file segments shown above in FIG. 6A) that can be combined to generate the respective content in the first file format. In some implementations, the set of file portions includes two or more of the file portions that each include data corresponding to both audio and video content. In some implementations, the file portions are divided temporally, so that in a sequence of file portions, earlier file portions in the sequence correspond to earlier portions of the content and later file portions in the sequence correspond to later portions of the content and, after receiving the first portion or the first few portions, a client can start presenting the content to a user while downloading additional portions. Thus, for example, the client is enabled to stream the content without having downloaded all of the portions.

The computer system provides (808) to a second client (e.g., client device 110-*n*), having second file format processing capabilities different from the first file format processing capabilities, second information that enables the second client to access respective content in a second file format (e.g., an augmented HLS format) different from the first file format. For example, the computer system provides the second client with a second portion of the previously obtained content-access information (e.g., from source table 334) that includes locations from which the respective content in the second file format can be retrieved and/or provides the second client with the respective content in the second file format.

Additionally, when the second client has second file format processing capabilities, the second client is provided with at least one file portion (e.g., comprising metadata) different from the file portions provided to the first client with first file processing capabilities. The second client is also provided with at least one same file portion as the first client with first file format processing capabilities. Thus, in some implementations, the respective content is not simply being remuxed or transmuxed at the client or the server; rather, the respective content is divided up so that it can be provided to, used by, and shared between, different clients with different file processing capabilities (e.g., without requiring the different clients to transmux the content after it is received).

The second information identifies (810) a second set of file portions (e.g., the file segments shown above in FIG. 6B) that can be combined to generate the respective content in the second file format. The second set of file portions includes (812) one or more shared file portions that are included in the first set of file portions. Additionally, in some implementations, the shared file portions include muxed (multiplexed) content that includes two or more content types (e.g., video, audio, text, etc.) and the shared file portions can be used in either the first file format or the second file format without remuxing or transmuxing the content. In some implementations, after receiving a respective set of file portions, the client remuxes or transmuxes the content in the file portions to change a media container that is used to organize the content. In some circumstances, for remuxing or transmuxing between two different media containers, the specifications of the different media containers needs to be known by the client performing the remuxing or transmuxing. In contrast, in some implementations, when combining a respective set (e.g., a first set or second set) of file portions to generate the respective content, the information for combining the respective set of file portions is contained in the file format (e.g., the order in which the file portions are to be combined indicates how the file portions are to be combined).

In some implementations, the first file format provides functionality that is not provided (814) by the second file format. In some implementations, the second file format provides functionality that is not provided (816) by the first file format. For example, the second file format enables the client device 110-1 to seek within the media content using coarse and/or fine searching (e.g., keyframe-based and frame-based seeking, respectively). In another example, the second file format includes a reduced-size, lightweight file header enabling segmentation and/or coarse searching of the media file.

In some implementations, the first set of file portions and the second set of file portions are distributed (818) between a plurality of computing devices in a media delivery system (e.g., a distributed content provision network). For example, with reference to FIG. 1B, the file portions comprising the first set of file portions and the second set of file portions are distributed among a plurality of computing devices (e.g., peers 133 in P2P network 132, network cache 136, redundant content host servers 138, local cache 105, etc.) in media delivery system 150.

In some implementations, a leading portion in the first set of file portions is (820) different from a leading portion of the second set of file portions (e.g., segment 1 of first information 600 in FIG. 6A is different from segment 1 of second information 650 in FIG. 6B). In some implementations, the leading portion of the first set of file portions is followed (822) by a set of shared file portions in a respective order, and the leading portion of the second set of file portions is followed by the set of shared file portions in the respective order (e.g., segments 2 and 3 of first information 600 in FIG. 6A are the same as segments 2 and 3 of second information 650 in FIG. 6B). In some implementations, the leading portion of the second set of file portions includes (824) respective metadata that is not included in the leading portion of the first set of file portions (e.g., file header 652 in segment 1 of second information 650 in FIG. 6B is not included in segment 1 of first information 600 in FIG. 6A). In some implementations, the respective metadata is appended (826) to a beginning of the leading portion of the second set of file portions. FIG. 6B, for example, shows file header 652 appended to the beginning of segment 1 the second set of file portions corresponding to second information 650. In some implementations, the second information has (828) a file header that includes information (e.g., a cluster index) that enables coarse searching (e.g., keyframe-based searching) within the file.

In some implementations, the second information has (830) a file header that includes information that enables the client to obtain (e.g., retrieve) a fine-searching metadata file, the fine-searching metadata file including information (e.g., cluster headers) that enables fine searching (e.g., frame-based seeking) within the file. FIG. 6C, for example, shows file header 652 corresponding to second information 650, including cluster header location information 656, which points to the location of metadata file 654. FIG. 6C, for example, shows metadata file 654 including a plurality of cluster headers 428 for the clusters comprising second information 650. In some implementations, cluster headers 428 enable fine searching (e.g., frame-based seeking) within the media file.

In some implementations, the first set of file portions includes file portions that are (832) compatible with the first file format, and the second set of file portions includes file portions that are compatible with the first file format (and, optionally, are not compatible with the second file format) and modification information that enables the second client to generate file portions that are compatible with the second file format from file portions in the first format. For example, the file portions in the first and second sets are shared. In some implementations, a first client will receive a respective set of file portions in the first file format, and a second client will receive the respective set of file portions in the first file format and a file header (e.g., modification information)

enabling playback of content corresponding to the respective set of file portions in the second file format.

In some implementations, respective file portions are compatible with a respective file format when the file portions can be used to generate content in the respective file format. In some implementations, the first file format is a file format used by devices (e.g., portable multifunction devices such as smartphones and tablet computers) that have limited processing resources and are not capable of generating file portions in a different format or can generate file portions in the different format but suffer from a noticeable impact on performance (e.g., reduction in battery life, overheating, lag or stutters in video/audio playback, etc.) to do so; while the second file format is a file format used by devices with greater processing resources (e.g., gaming consoles or personal computers such as desktop or laptop computers) that are capable of generating file portions in a different format using the second modification information without a noticeable impact on performance (e.g., reduction in battery life, overheating, lags or stutters in video/audio playback, etc.). In some implementations, the first client also converts portions of the content based on playback requirements at the first client (e.g., audio content in AAC format is converted to MP3 format or vice versa). In some implementations, in addition to generating file portions that are compatible with the second file format, the second client also converts portions of the content based on playback requirements at the second client (e.g., audio content in AAC format is converted to MP3 format or vice versa).

In some implementations, the modification information enables (834) the second client to alter (e.g., add, remove, and/or replace) metadata from the second set of file portions to generate file portions that are compatible with the second file format (e.g., without transcoding or converting the underlying content in the second set of file portions). In some implementations, the modification information includes (836) information that enables the second client to transcode the second set of file portions from the first file format to the second file format to generate file portions that are compatible with the second file format (e.g., instead of, or in addition to, altering metadata in the first set of file portions). For example, transcoding MPEG-2 files to MPEG-4 files or transcoding MPEG-2 files to H.264 files.

In some implementations, the first set of file portions includes (838) respective file portions (that are not compatible with the first file format) and first modification information that enables the first client to generate file portions that are compatible with the first file format from the respective file portions, and the second set of file portions includes the respective file portions (that are not compatible with the second file format) and second modification information that enables the second client to generate file portions that are compatible with the second file format from the respective file portions. For example, the first set of file portions includes raw portions and a first file header for playback in the first file format, and the second set of portions includes the raw portions and a second file header for playback in the second file format) In some implementations, respective file portions are compatible with a respective file format when the file portions can be used to generate content in the respective file format. In some implementations, in addition to generating file portions that are compatible with the first file format, the first client also converts portions of the content based on playback requirements of the first client (e.g., audio content in AAC format is converted to MP3 format or vice versa). In some implementations, in addition to generating file portions that are compatible with the second file format, the second client also converts portions of the content based on playback requirements of the second client (e.g., audio content in AAC format is converted to MP3 format or vice versa).

In some implementations, the respective file portions are not (840) compatible with the first file format or the second file format. For example, the file portions are raw, unformatted file portions or portions in a third format. In some implementations, the first modification information enables (842) the first client to alter (e.g., add, remove and/or modify) metadata from the respective portions to generate file portions that are compatible with the first file format (e.g., without transcoding or converting the underlying content in the first set of file portions), and the second modification information enables the second client to alter (e.g., add, remove and/or modify) metadata from the respective portions to generate file portions that are compatible with the second file format (e.g., without transcoding or converting the underlying content in the second set of file portions).

In some implementations, the first modification information includes (844) information that enables the first client to transcode the first set of file portions from a respective file format to the first file format to generate file portions that are compatible with the first file format (e.g., instead of, or in addition to, altering metadata in the first set of file portions), and the second modification information includes information that enables the second client to transcode the second set of file portions from the respective file format to the second file format to generate file portions that are compatible with the second file format (e.g., instead of, or in addition to, altering metadata in the second set of file portions).

In some implementations, the respective content is shared (846) over a peer-to-peer network, and clients having the first file format processing capabilities make shared file portions available (e.g., "seed" the shared file portions) to clients having the first file format processing capabilities and to clients having the second file format processing capabilities. In some implementations, clients having the second file format processing capabilities make shared file portions available (e.g., "seed" the shared file portions) to clients having the second file format processing capabilities and to clients having the first file format processing capabilities. Thus, in some implementations clients that have different file format processing capabilities are still able to participate in the same peer-to-peer network (e.g., P2P network 132 in media delivery system 150 shown in FIG. 1B) and exchange file portions that are used at the various clients to generate the same content in different file formats. Enabling different kinds of clients to participate in the same peer to peer network improves the performance and reliability of peer-to-peer distribution by increasing the number of peers for the respective content.

It should be understood that the particular order in which the operations in 8A-8D have been described is merely exemplary, and is not intended to indicate that the described order is the only order in which the operations could be performed. One of ordinary skill in the art would recognize various ways to reorder the operations described herein. It should be noted that details of other processes described herein with respect to other methods described herein (e.g., method 700) are also applicable in an analogous manner to method 800 described above with respect to FIGS. 8A-8D. Additionally, it should be noted that details of other processes described herein with respect to other methods described herein (e.g., method 700) are also applicable in an analogous manner to method 800 described above with respect to FIGS. 8A-8D. For example, the requests, media files, and file headers described above with reference to method 800 optionally have one or more of the characteristics of the requests, media files, and file headers described herein with reference to other methods described herein (e.g., method 700). For brevity, these details are not repeated here.

Plural instances are, optionally provided for components, operations, or structures described herein as a single instance. Finally, boundaries between various components, operations, and data stores are somewhat arbitrary, and particular operations are illustrated in the context of specific illustrative configurations. Other allocations of functionality are envisioned and optionally fall within the scope of the implementation(s). In general, structures and functionality presented as separate components in the example configurations are, optionally, implemented as a combined structure or component. Similarly, structures and functionality presented as a single component are, optionally, implemented as separate components. These and other variations, modifications, additions, and improvements fall within the scope of the implementation(s).

It will also be understood that, although the terms "first," "second," are, in some circumstances, used herein to describe various elements, these elements should not be limited by these terms. These terms are only used to distinguish one element from another. For example, first information could be termed second information, and, similarly, second information could be termed first information, which changing the meaning of the description, so long as all occurrences of the "first information" are renamed consistently and all occurrences of "second information" are renamed consistently. The first information and the second information are both information, but they are not the same information.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and non-transitory computer readable storage media that embody illustrative implementations. For purposes of explanation, numerous specific details were set forth in order to provide an understanding of various implementations of the inventive subject matter. It will be evident, however, to those skilled in the art that implementations of the inventive subject matter is, optionally, practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method of seeking within media content, comprising:
   at an electronic device with one or more processors and memory;
     obtaining a file header for a file that corresponds to a plurality of separately indexed segments and a plurality of separately indexed clusters, wherein:
       the file is divided into the plurality of segments;
       one or more of the plurality of segments each include multiple sequential clusters from the plurality of clusters;
       each cluster of the plurality of clusters includes respective content portions and has a respective content index, of a plurality of content indices, that indexes the respective content portions;
       the file header includes a cluster index that maps positions within the file to cluster offset information for each cluster of the plurality of clusters; and
       the file header includes a segment index that enables the device to identify, based on the cluster offset information, a respective segment that includes requested content;
     receiving a request to seek to a position within the file;
     in response to receiving the request:
       identifying a first segment, including:
         mapping the position to corresponding offset information for a first cluster, using the cluster index; and
         mapping the corresponding offset information for the first cluster to the first segment, using the segment index, wherein the first segment includes the first cluster;
       obtaining the first segment;
       obtaining a first content index of the plurality of content indices that corresponds to the first cluster within the first segment; and
       after obtaining the first segment, using the first content index to identify, within the first cluster, the content corresponding to the position; and
     providing at least a portion of the identified content to a presentation device for presentation to a user.

2. The method of claim 1, wherein:
   the file includes video data;
   a respective cluster of the plurality of clusters corresponds to a group of frames with a respective keyframe; and
   the identified content corresponds to one or more frames in the video data.

3. The method of claim 1, wherein:
the file includes audio data;
a respective cluster of the plurality of clusters corresponds to a group of audio samples or audio frames; and
the identified content corresponds to one or more audio samples or audio frames in the audio data.

4. The method of claim 1, wherein the file header is obtained in response to a request for content associated with the file.

5. The method of claim 1, wherein the file header further includes a global header that provides content description information that enables the device to prepare content of the file for presentation to the user.

6. The method of claim 1, wherein obtaining the first segment includes requesting the first segment from a first source using an identifier of the first segment retrieved from the segment index.

7. The method of claim 6, wherein the identifier of the first segment includes a cryptographic hash.

8. The method of claim 1, wherein:
the plurality of segments of the file are distributed among a plurality of sources; and
the first segment is available from a plurality of different sources.

9. The method of claim 1, including after obtaining the first segment, obtaining a second segment, wherein:
when the file corresponds to on-demand content, the second segment is obtained from a respective source selected from a source table that includes a plurality of sources from which the second segment is available; and
when the file corresponds to live content, the second segment is obtained from the first source.

10. The method of claim 1, wherein the plurality of segments for the file include one or more cluster-aligned segments that each include an integer number of clusters greater than or equal to one.

11. The method of claim 10, wherein:
one segment of the plurality of segments includes a first set of N clusters; and
a different segment of the plurality of segments includes a second set of M clusters, wherein the clusters in the first set of N clusters are distinct from the clusters in the second set of M clusters.

12. The method of claim 1, wherein the file header is compressed, and the method includes, prior to using the segment index, decompressing the file header and identifying the segment index in the decompressed file header.

13. The method of claim 1, wherein:
the file header is obtained from a first location; and
the content corresponding to the file is obtained from a second location distinct from the first location.

14. The method of claim 1, wherein:
the first cluster of the plurality of clusters has a first size; and
a second cluster of the plurality of clusters has a second size different from the first size.

15. The method of claim 1, wherein:
the first content index includes information that maps respective timestamps to respective positions of content portions of the first cluster; and
the cluster index does not include the information in the first content index.

16. The method of claim 1, wherein obtaining the first content index includes obtaining a cluster header associated with the first cluster based on information retrieved from the cluster index.

17. The method of claim 16, wherein:
the cluster header is obtained from a first location; and
the cluster data is obtained from one or more locations different from the first location.

18. A computer system, comprising:
one or more processors; and
memory storing one or more programs configured to be executed by the one or more processors, the one or more programs including instructions for:
obtaining a file header for a file that corresponds to a plurality of separately indexed segments and a plurality of separately indexed clusters, wherein:
the file is divided into the plurality of segments;
one or more of the plurality of segments each include multiple sequential clusters from the plurality of clusters;
each cluster of the plurality of clusters includes respective content portions and has a respective content index of a plurality of content indices, that indexes the respective content portions;
the file header includes a cluster index that maps positions within the file to cluster offset information for each cluster of the plurality of clusters; and
the file header includes a segment index that enables the device to identify, based on the cluster offset information, a respective segment that includes requested content;
receiving a request to seek to a position within the file;
in response to receiving the request:
identifying a first segment, including:
mapping the position to corresponding offset information for a first cluster, using the cluster index; and
mapping the corresponding offset information for the first cluster to the first segment, using the segment index, wherein the first segment includes the first cluster
obtaining the first segment;
obtaining a first content index of the plurality of content indices that corresponds to the first cluster within the first segment; and
after obtaining the first segment, using the first content index to identify, within the first cluster, the content corresponding to the position; and
providing at least a portion of the identified content to a presentation device for presentation to a user.

19. A non-transitory computer readable storage medium storing one or more programs, the one or more programs comprising instructions, which, when executed by an electronic device with one or more processors, cause the device to:
obtain a file header for a file that corresponds to a plurality of separately indexed segments and a plurality of separately indexed clusters, wherein:
the file is divided into the plurality of segments;
one or more of the plurality of segments each include multiple sequential clusters from the plurality of clusters;
each cluster of the plurality of clusters includes respective content portions and has a respective content index of a plurality of content indices, that indexes the respective content portions;
the file header includes a cluster index that maps positions within the file to cluster offset information for each cluster of the plurality of clusters; and the file header includes a segment index that enables the device to identify, based on the cluster offset information, a respective segment that includes requested content;

receive a request to seek to a position within the file;

in response to receiving the request:
  identify a first segment, including:
    map the position to corresponding offset information for a first cluster, using the cluster index; and
    map the corresponding offset information for the first cluster to the first segment, using the segment index, wherein the first segment includes the first cluster;
  obtain the first segment;
  obtain a first content index of the plurality of content indices that corresponds to the first cluster within the first segment; and
  after obtaining the first segment, using the first content index, identify, within the first cluster, the content corresponding to the position; and provide at least a portion of the identified content to a presentation device for presentation to a user.

* * * * *